(12) United States Patent
Yu et al.

(10) Patent No.: US 8,934,543 B2
(45) Date of Patent: Jan. 13, 2015

(54) ADAPTIVE QUANTIZATION WITH BALANCED PIXEL-DOMAIN DISTORTION DISTRIBUTION IN IMAGE PROCESSING

(75) Inventors: Xiang Yu, Kitchener (CA); Dake He, Waterloo (CA); En-Hui Yang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 448 days.

(21) Appl. No.: 12/704,641

(22) Filed: Feb. 12, 2010

(65) Prior Publication Data

US 2010/0208805 A1    Aug. 19, 2010

Related U.S. Application Data

(60) Provisional application No. 61/152,410, filed on Feb. 13, 2009.

(51) Int. Cl.
| | |
|---|---|
| *H04N 7/12* | (2006.01) |
| *H04N 19/14* | (2014.01) |
| *H04N 19/154* | (2014.01) |
| *H04N 19/18* | (2014.01) |
| *H04N 19/147* | (2014.01) |
| *H04N 19/61* | (2014.01) |
| *H04N 19/124* | (2014.01) |

(52) U.S. Cl.
CPC ....... *H04N 19/00157* (2013.01); *H04N 19/002* (2013.01); *H04N 19/00296* (2013.01); *H04N 19/00175* (2013.01); *H04N 19/00781* (2013.01); *H04N 19/0009* (2013.01)
USPC .................................................... 375/240.12

(58) Field of Classification Search
USPC ........................................ 375/240.03, 240.01
See application file for complete search history.

(56) References Cited

U.S. PATENT DOCUMENTS

| | | | | |
|---|---|---|---|---|
| 4,776,030 | A | | 10/1988 | Tzou |
| 5,731,835 | A | * | 3/1998 | Kuchibholta .............. 348/390.1 |
| 5,745,169 | A | * | 4/1998 | Murphy et al. .............. 348/192 |
| 5,926,574 | A | | 7/1999 | Nishikawa et al. |
| 5,933,194 | A | * | 8/1999 | Kim et al. .................. 348/403.1 |
| 5,933,541 | A | | 8/1999 | Kutka et al. |

(Continued)

FOREIGN PATENT DOCUMENTS

| | | |
|---|---|---|
| CA | 2527654 | 6/2006 |
| JP | 07184056 | 7/1995 |

(Continued)

OTHER PUBLICATIONS

International Search Report dated May 11, 2010.

(Continued)

*Primary Examiner* — Dave Czekaj
*Assistant Examiner* — Tracy Li
(74) *Attorney, Agent, or Firm* — Rowand LLP

(57) ABSTRACT

Methods and encoders and decoders for adaptively quantizing transform domain coefficients in image and/or video encoding/decoding. For an image having a number of blocks, each block having N coefficients, the quantization step size for each coefficient is selected dynamically, thus resulting in a quantizer that may apply different step sizes to different coefficients. The selected step sizes for each coefficient are used for those coefficients within all blocks in the image/frame. In one aspect, the step sizes are selected on the basis of balancing pixel domain distortion when the image/frame is decoded.

22 Claims, 14 Drawing Sheets

(56) References Cited

U.S. PATENT DOCUMENTS

| | | | |
|---|---|---|---|
| 6,005,982 | A | 12/1999 | Abe |
| 6,459,731 | B1* | 10/2002 | Matthews et al. ........ 375/240.03 |
| 2001/0019634 | A1 | 9/2001 | Lainema et al. |
| 2003/0147561 | A1 | 8/2003 | Faibish et al. |
| 2004/0081368 | A1 | 4/2004 | Mathew et al. |
| 2006/0008001 | A1 | 1/2006 | Lee et al. |
| 2006/0078052 | A1 | 4/2006 | Dang |
| 2007/0206871 | A1 | 9/2007 | Jalil et al. |
| 2007/0237236 | A1* | 10/2007 | Chang et al. ............. 375/240.18 |
| 2007/0279266 | A1 | 12/2007 | Chen et al. |
| 2008/0013633 | A1 | 1/2008 | Ye et al. |
| 2009/0257489 | A1 | 10/2009 | Karczewicz et al. |
| 2010/0040298 | A1* | 2/2010 | Chen et al. .................... 382/233 |
| 2010/0135398 | A1 | 6/2010 | Wittmann et al. |
| 2010/0220790 | A1 | 9/2010 | Jeon et al. |
| 2011/0103467 | A1 | 5/2011 | Wedi et al. |

FOREIGN PATENT DOCUMENTS

| | | |
|---|---|---|
| JP | 10075449 | 3/1998 |
| WO | 2008042259 A2 | 4/2008 |
| WO | 2008044511 | 4/2008 |
| WO | WO2008/044511 | 4/2008 |
| WO | WO 2008/044511 | 4/2008 |
| WO | 2008111744 A1 | 9/2008 |

OTHER PUBLICATIONS

International Search Report dated Apr. 20, 2010.
I. E. G. Richardson, H.264 and MPEG-4 video compression ' video coding for next generation multimedia, Chichester; Hoboken, NJ Wiley, 2003.
D. Marpe, V. George, H. L. Cycon, and K. U. Barthel, "Performance evaluation of Motion-JPEG2000 in comparison with H.264/AVC operated in pure intra coding mode," in Proceedings of SPIE, vol. 5266, pp. 129-137, Feb. 2004.
Y. Ye, M. Karczewicz, "Improved h.264 intra coding based on bi-directional intra prediction, directional transform, and adaptive coefficient scanning," in Proceedings of 15th IEEE International Conference on Image Processing, 2008, Oct. 12-15, 2008, pp. 2116-2119.
T.K. Tan, CS. Boon, and Y. Suzuki, "Intra Prediction by Template Matching," in Proceedings of IEEE International Conference on Image Processing, 2006, pp. 1693-1696, Oct. 2006.
A. Al, B.P. Rao, S.S. Kudva, S. Babu, D. Sumam, A.V. Rao, "Quality and complexity comparison of H.264 intra mode with JPEG2000 and JPEG," in Proceedings of IEEE International Conference on Image Processing, 2004, vol. 1, pp. 525-528, Oct. 2004.
H.S. Malvar, A. Hallapuro, M. Karczewicz, L. Kerofsky, "Low-complexity transform and quantization in H.264/AVC," IEEE Transactions on Circuits and Systems for Video Technology, vol. 13, Issue 7, pp. 598-603, Jul. 2003.
P. List, A. Joch, J. Lainema, G. Bjntegaard, and M. Karczewicz, "Adaptive Deblocking Filter," IEEE Transactions on Circuits and Systems for Video Technology, vol. 13, No. 7, pp. 614-619, Jul. 2003.
A. Tanizawa, T. Chujoh, "Simulation results of Adaptive Quantization Matrix Selection on KTA software," ITU-5G16/Q6, Document VCEG-ACO7, Klagenfurt, Austria, Jul. 17-18, 2006.
S.-B. Wang, X.-L. Zhang, Y. Yao, Z. Wang, "H.264 Intra Prediction Architecture Optimization," in Proceedings of IEEE International Conference on Multimedia and Expo, 2007, pp. 1571-1574, Beijing, China, Jul. 2-5, 2007.
D. Marpe and H. Schwarz and T. Wiegand, "Context-based Adaptive Binary Arithmetic Coding in the H.264/AVC Video Compression Standard," IEEE Transaction on Circuits and Systems for Video Technology,Vo. 13, No. 7, pp. 620-636, Jul. 2003.
L. Zhang, X. Wu, N. Zhang, W. Gao, Q. Wang, D. Zhao, "Context-based Arithmetic Coding Reexamined for DCT Video Compression," in Proceedings of IEEE International Symposium on Circuits and Systems, 2007, pp. 3147-3150, 2730 May 2007.
USPTO, Final Office Action relating to U.S. Appl. No. 13/334,227 dated Dec. 3, 2012.
CIPO, Examiners Report relating to application No. 2,751,785 dated Nov. 28, 2012.
JPO, Notice of Reasons for Rejection relating to application No. 2011-549406 dated Nov. 13, 2012.
Canadian Intellectual Property Office, Examiner's Report dated Nov. 22, 2012 relating to application No. 2,751,802.
CA Office Action dated Sep. 11, 2013, CA 2,751,785.
USPTO, US Office Action relating to U.S. Appl. No. 12/704,623, dated Jan. 2, 2014.
Lee J S et al: 11 0n the transformed entropy-constrained vector quantizers employing Mandala block for image coding, Signal Processing. Image Communication, Elsevier Science Publishers, Amsterdam, NL, vol. 7, No. 1, Mar. 1, 1995.
Xiang Yu et al: "Adaptive quantization with balanced distortion distribution and its application to H.264 intra coding", Image Processing (ICIP), 6th IEEE International Conference on, IEEE, Piscataway, NJ, USA, Nov. 7, 2009.
Extended European Search Report dated Nov. 9, 2012, European Patent Application No. EP10740868.4.
USPTO, Final Office Action relating to U.S. Appl. No. 12/704,623 dated Nov. 15, 2012.
EPO, Extended European Search Report relating to application No. 10740869.2 dated Nov. 9, 2012.
EPO, Extended European Search Report relating to application No. 10740870.0 dated Nov. 9, 2012.
Xiang Yu et al., "Adaptive quantization with balanced distortion distribution and its application to H.264 intra coding", Image Processing (ICIP), 2009 16th IEEE International Conference on, IEEE, Piscataway, NJ, USA, Nov. 7, 2009, pp. 1049-1052, XP031628437.
List P et al., "Adaptive deblocking filter", IEEE Transactions on Circuits and Systems for Video Technology, IEEE Service Center, Piscataway, NJ, US, vol. 13, No. 7, Jul. 1, 2003, pp. 614-619, XP011221094.
Xiang Yu et al, "Adaptive quantization with balanced distortion distribution and its application to H.264 intra coding", Image Processing (ICIP), 2009 16th IEEE International Conference on, IEEE, Piscataway, NJ, USA, Nov. 7, 2009, pp. 1049-1052, XP031628437.
KIPO, Office Action relating to application No. 10-2011-7021056 dated Mar. 30, 2013.
JPO, Notice of Reasons for Rejection relating to application No. 2011-549406 dated Mar. 29, 2013.
Japanese Office Action, Application No. 2011-549407.

* cited by examiner

ADAPTIVE QUANTIZATION WITH BALANCED PIXEL-DOMAIN DISTORTION DISTRIBUTION IN IMAGE PROCESSING

FIELD

The present application generally relates to image coding and decoding, and in particular to a method and encoder that adaptively quantizes image data in order to balance pixel-domain distortion distribution.

BACKGROUND

The current state-of-the-art for video encoding is the ITU-T H.264/AVC video coding standard. It defines a number of different profiles for different applications, including the Main profile, Baseline profile and others.

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

When spectrally transforming residual data, many of these standards prescribe the use of a discrete cosine transform (DCT) or some variant thereof. The resulting DCT coefficients are then quantized using a quantizer that employs a uniform quantization step size, and possibly a dead zone at the center.

A problem that arises with quantization is that it produces a certain degree of quantization distortion. The quantization distortion is almost evenly distributed among the DCT coefficients because uniform quantization is applied; however, once the encoded data is decoded and the pixel data is reconstructed, it is found that the corresponding distortion distribution among the pixels is highly biased. That is, there are higher levels of distortion at the edges of blocks in the pixel domain than in the middle of the blocks. This unevenly distributed distortion in the pixel domain can result in noticeable artifacts.

It would be advantageous to provide for an improved encoder, decoder and method of encoding or decoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
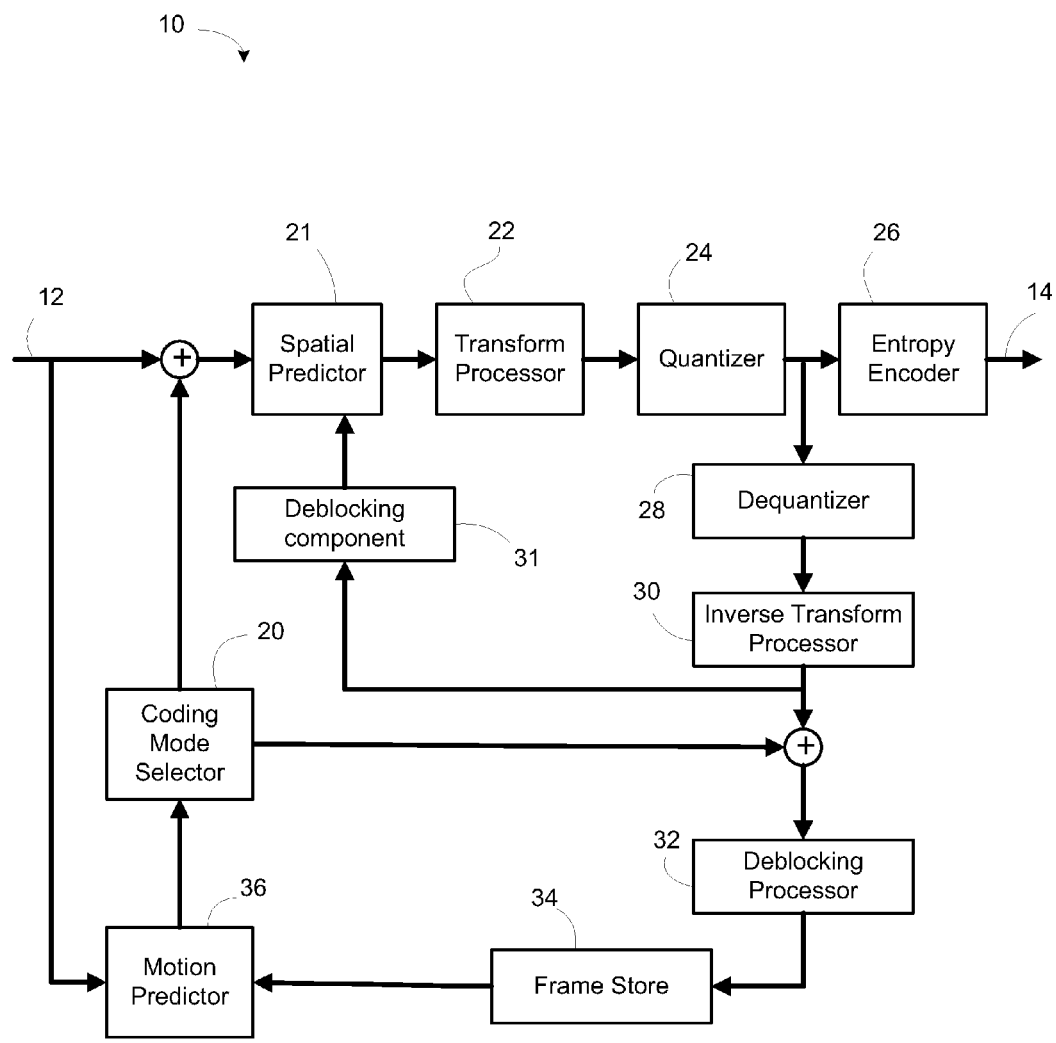
FIG. 1 shows, in block diagram form, an encoder for encoding video.

The present application describes methods and encoders/decoders for achieving improvements in image and video encoding/decoding. In particular, the present application describes a method of adaptively quantizing transform domain coefficients. For an image having a number of blocks, each block having N coefficients, the quantization step size for each coefficient is selected dynamically, thus resulting in a quantizer that may apply different step sizes to different coefficients. The selected step sizes are used for all blocks within the image/frame. In one aspect, the step sizes are selected on the basis of balancing pixel domain distortion when the image/frame is decoded.

The present application further describes methods and encoders/decoders configured to apply in-loop deblocking to intra-coded images/frames. In one aspect, a deblocking filter is applied to decoded pixels of an intra-coded block prior to decoding the subsequent block in the decoding sequence.

The present application yet further describes methods and encoders/decoders configured to entropy encode image/frame data using a revised context model. In one aspect, a block of quantized coefficients are encoded in a coding order dynamically determined on the basis of increasing quantization step size used in quantizing the coefficients. Other factors may also or alternatively be used to dynamically adjust the coding order.

Other aspects and features of the present application will be understood by those of ordinary skill in the art from a review of the following description of examples in conjunction with the accompanying figures.

In the description that follows, example embodiments are described with reference to the H.264 standard. Those ordinarily skilled in the art will understand that the present application is not limited to H.264 but may applicable to other video coding/decoding standards that employ intra-coded frames/slices. It will also be appreciated that the present application is not necessarily limited to video coding/decoding and may be applicable to image coding/decoding.

In the description that follows, the terms frame and slice are used somewhat interchangeably. Those of skill in the art will appreciate that, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both are applicable to frames, slices, or both for a given embodiment.

Figure 2:
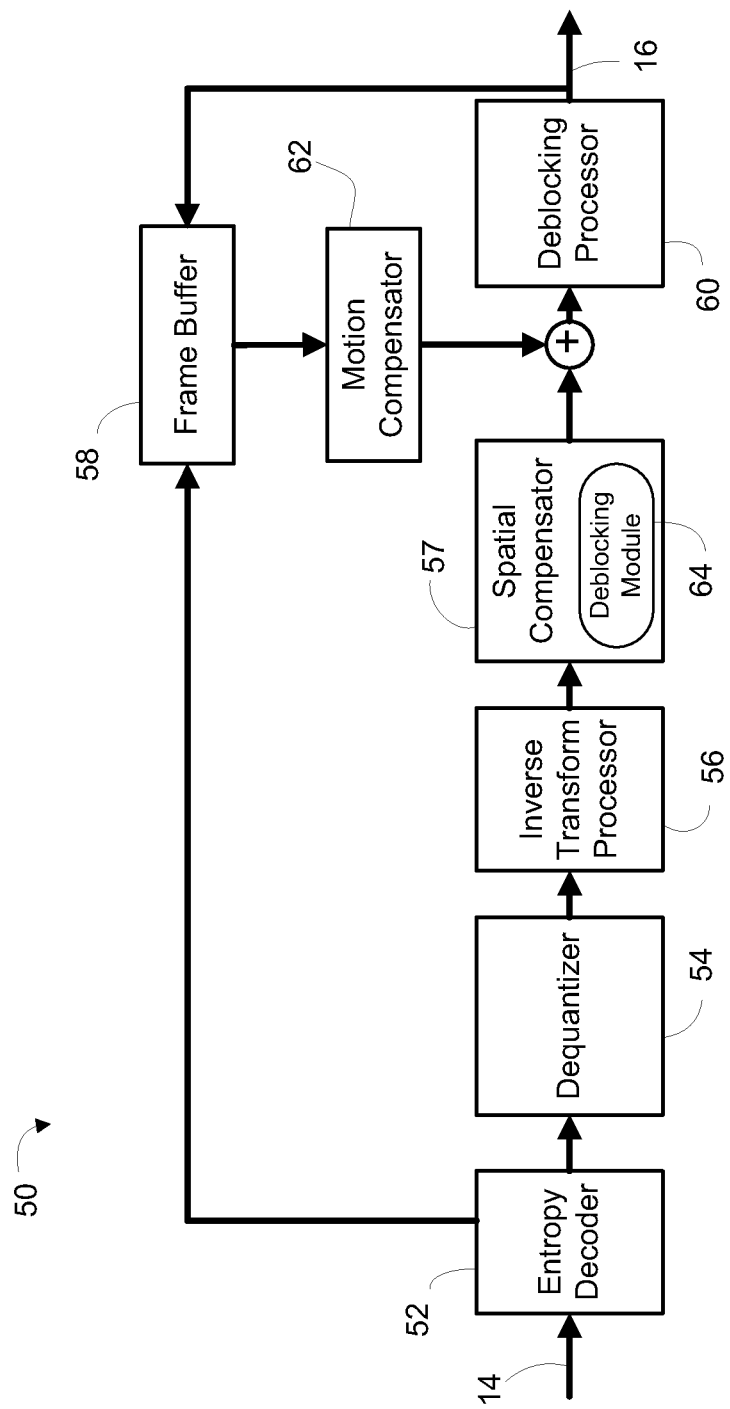
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks, as illustrated graphically in FIG. 3. In some cases, the transform blocks may be 8×8, meaning there are four transform blocks per macroblock. In yet other cases, the transform blocks may be other sizes.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame.

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the recreated video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

Figure 3:
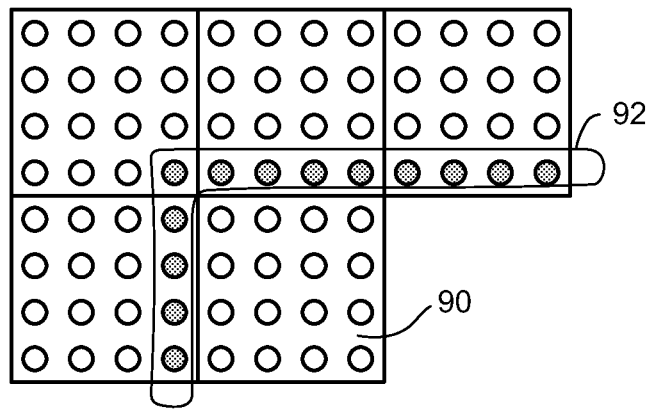
FIG. 3 illustrates the neighbouring pixels used in computing predictions for a block of size 4×4.
Figure 4:
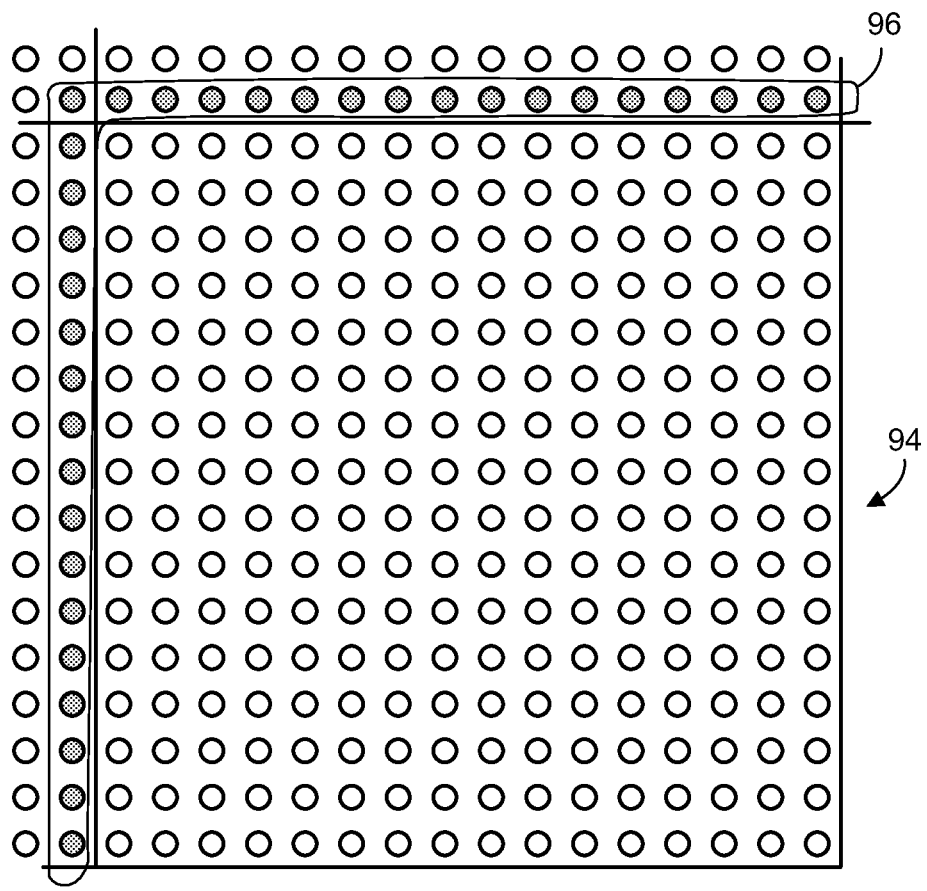
FIG. 4 illustrates the neighbouring pixels used in computing predictions for a block of size 16×16.

A problem that arises in connection with decoding is that intra-coded spatial prediction relies upon reconstructed pixels in neighbouring blocks. H.264, for example, follows a top-down, left-to-right, coding order when processing macroblocks or transform blocks, meaning that only blocks to the left of the current block and above the current block are available to supply pixel data during the decoding process (this is not to be confused with the coding order for coefficients within the entropy encoding process, which often follows a zig-zag pattern; further discussion of this coefficient coding order occurs later in the description). For example, a block of size 4×4 may use up to 13 neighbouring pixels to compute its prediction, as illustrated in FIG. 3. In FIG. 3, the pixels of a current block 90 are encoded based on the pixel values of the up to 13 neighbouring pixels indicated by reference numeral 92. FIG. 4 shows a 16×16 block 94. It will be noted that the 33 pixels to the immediate left and top of the block, indicated by reference numeral 96, may be used for spatial prediction.

The H.264 standard uses uniform quantization for all 4×4 DCT coefficients with up to 52 possible step sizes. The inventors have noted that the use of uniform quantization in the DCT domain results in reconstruction errors that tend to be higher at the boundaries of the block. For example, the following matrix shows the mean squared error (MSE) of 4×4 blocks in the first frame of foreman.cif when coded using Main Profile with a quantization parameter of 36:

$$\begin{pmatrix} 44.0 & 41.2 & 41.3 & 57.4 \\ 43.7 & 36.9 & 38.8 & 50.5 \\ 44.0 & 38.9 & 39.4 & 49.7 \\ 55.5 & 45.4 & 45.9 & 60.3 \end{pmatrix}$$

It will be noted that the pixels at the boundaries of the block have a significantly higher MSE than the pixels in the middle of the block. Unfortunately, it is these boundary pixels that tend to be used in the spatial prediction process. The predictions are based on the reconstructed pixel data (the encoder performs the decoding process in order to base its predictions on the same reconstructed data available to the decoder), meaning that errors in reconstructing the neighbouring pixels do not have a direct impact on the ability to reconstruct a spatially predicted pixel; however, errors in the values of neighbouring pixels lead to generally larger and/or more varied residual values, which means they are more costly to encode. As a result the errors in the boundary values of an intra-coded block have a negative impact on rate-distortion performance.

In-Loop Deblocking

In one aspect of the present application, the decoder and decoding process may be configured to apply in-loop deblocking to intra-coded blocks.

H.264 compliant decoders are configured to apply a powerful deblocking process to a reconstructed frame. Because the deblocking occurs after reconstruction of the full frame, it occurs after the spatial compensation has already occurred. The deblocking is considered "in-loop" with regard to motion compensation because the reference frames are collected in the frame store after the deblocking process, meaning that the motion compensator uses deblocked reference frames when reconstructing pixels of an inter-coded block. However, the pixels used in the H.264 spatial prediction are the reconstructed pixels before deblocking.

In one aspect of the present application, the decoder is configured to apply deblocking to individual blocks within the spatial prediction process. In other words, deblocking is applied, block-by-block, as blocks are reconstructed instead of after the full frame is completed. With respect to inter-coded frames, the deblocking, in some embodiments, may still be applied after the full frame is complete, or in some embodiments, it may be performed block-by-block as will be described below in connection with intra-coded frames.

Figure 5:
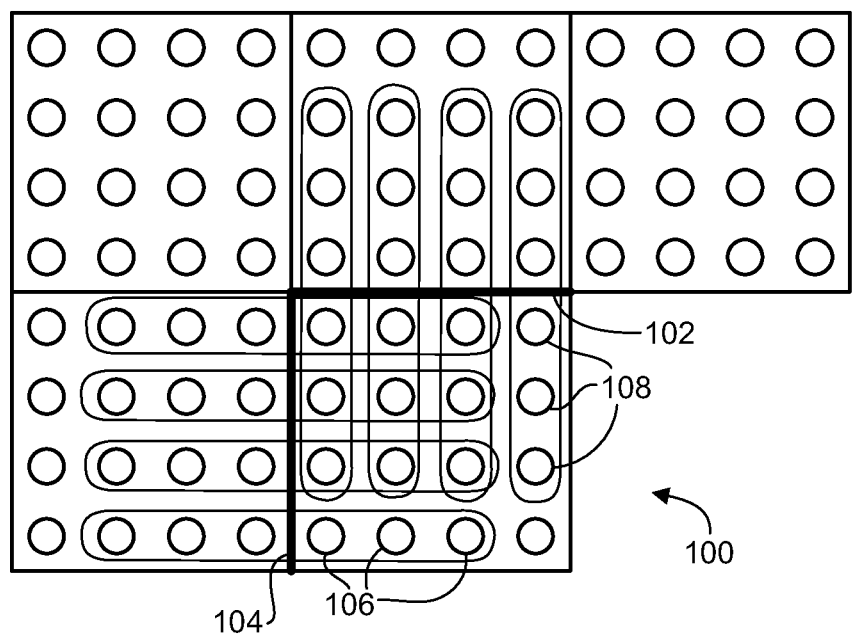
FIG. 5 shows impact of a deblocking filter on an example 4×4 block.

Reference is now made to FIG. 5, which shows the deblocking impact on an example 4×4 block 100. The block 100 is the most recently decoded block in the frame. Blocks above and to the left of block 100 have already been reconstructed. It will be noted that for a given block the deblocking can only be applied to its left and top boundaries directly (blocks crossing its right and bottom boundaries have not been reconstructed yet), but it is the bottom and right boundaries that will be used in prediction computation and may affect the coding of future blocks. Nevertheless, it will be noted from the following description that applying deblocking to the upper and left boundaries of the block 100 has a positive benefit if the lower and right pixels of the block 100 are subsequently used for spatial prediction in later blocks.

Referring still to FIG. 5, those skilled in the art will appreciate that some deblocking filters, like those prescribed, for example, in H.264, may enhance up to three pixels deep from a boundary. For example "mode 4" within the H.264 deblocking process has an effect three pixels deep. Moreover, under the boundary strength model used in H.264 because the block is intra-coded the deblocking mode that will be employed is either mode 4 or mode 3, depending on whether the boundary is also a macroblock boundary. Accordingly, it will be noted that deblocking the upper boundary 102 and left boundary 104 of the block 100 may have an impact on fifteen of the sixteen pixels in the block 100. Notably, the deblocking may impact three out of four of the pixels 108 on the right boundary, and three out of four of the pixels 106 on the bottom boundary. Therefore, deblocking the upper boundary 102 and the left boundary 104 will have an influence on the quality of the pixel data on the bottom and right boundaries, which may be used in spatial prediction for neighbouring blocks.

Accordingly, referring again to FIG. 2, the spatial compensator 57 is configured to apply deblocking to individual reconstructed blocks within the intra-coded decoding loop. In other words, it is applied on a block-by-block basis, and only to the upper and left boundaries of the blocks. Moreover, it is applied to each block as it is reconstructed before proceeding with the reconstruction of the next block within the frame. As a result, the pixel data available to the spatial compensator 57 is partially deblocked ("partially", because at least the bottom right corner pixel is not deblocked).

As shown in FIG. 2, the spatial compensator 57 includes a deblocking module 64. It will be understood that in some embodiments, the deblocking module 64 may include a call to a pre-existing deblocking routine or other software component normally used in the deblocking processor 60.

Referring again to FIG. 1, it will be noted that the encoder 10 according to the present application includes a deblocking component 31. Like the deblocking module 64 (FIG. 2), the deblocking component 31 is for applying deblocking to the upper and left boundaries of reconstructed blocks before reconstruction of the next block within the frame occurs. The deblocked pixel data from the blocking component 31 is then available to the spatial predictor 21 so that it may base its predictions on the deblocked pixel data.

Figure 6:
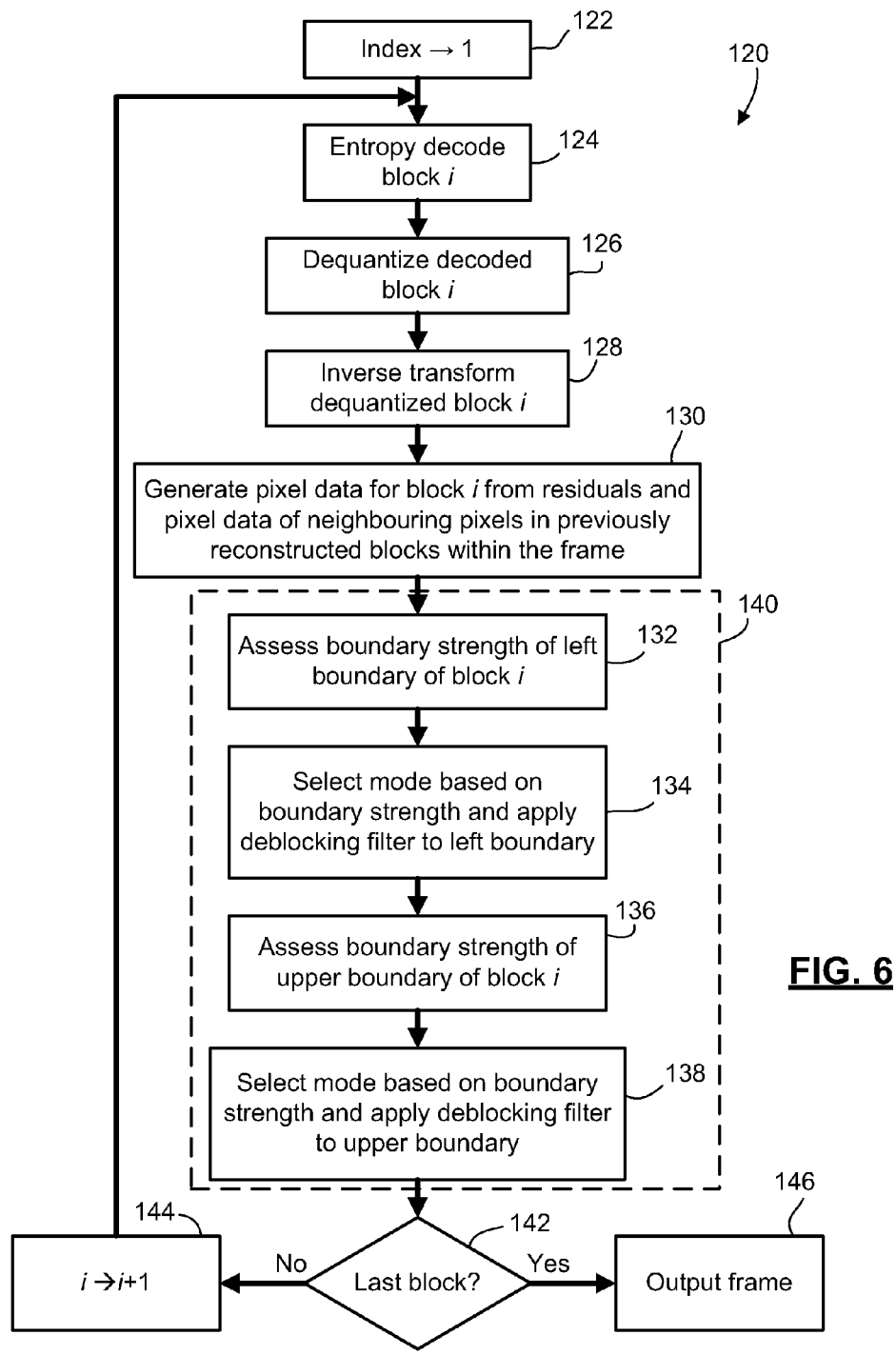
FIG. 6 shows, in flowchart form, a decoding process.

Reference is now made to FIG. 6, which shows, in flowchart form, a decoding process 120. The decoding process 120 depicted in FIG. 6 is an example process intended for decoding an intra-coded frame of video. The frame of video may be encoded in accordance with the H.264 standard, subject to the alterations described herein; in particular, in-loop deblocking of intra-coded blocks. The encoding process results in a bitstream of encoded data. The process 120 may be implemented in a device, such as a set-top box, television, computer, mobile device, etc., configured to receive the bitstream, decode it to reconstruct the video data, and display or output the video. The decoding process for inter-coded frames is somewhat similar, but includes motion compensation and reconstructed frame storage steps that are not depicted in FIG. 6.

The process 120 begins in step 122 with the initialization of an index i. The index i indicates which block in the frame is the subject of the decoding process 120. Each block is processed in turn, following a left-to-right and top-to-bottom decoding process. The entropy decoding of the received bitstream begins with step 124, in which block i is entropy decoded. The entropy decoding converts the bitstream of encoded data into quantized transform domain coefficients. It may also recover side information, including quantizer step sizes and other information used by the decoder to reconstruct the video data.

For each block i, the process 120 involves dequantizing the quantized transform domain coefficients in step 126 to recover transform domain coefficients. The transform domain coefficients of block i are then inverse transformed in step 128 to reconstruct the residual data for each pixel. In an intra-coded block using spatial prediction, the pixel data reconstructed at step 128 is "residual" data, representing a differential relative to a reference pixel(s) from neighbouring blocks. Accordingly, in step 130, spatial compensation is applied to reconstruct the pixel values using the residual data and pixel data from neighbouring pixels in previously reconstructed blocks within the same frame. Step 130 results in reconstruction of the pixel video data for block i.

Step 140 (shown in dashed lines) is the application of a deblocking filter to the left and upper boundaries of block i. As noted above, deblocking the left and upper boundaries of the block i may result in improvements to the quality of the pixel data in at least some of the pixels on the right side and bottom of block i. It is this pixel data on the right side and bottom that may be used as the basis for predictions in subsequent blocks. Improvements in the quality of this data when used for spatial prediction can reduce the residual data that needs to be encoded and, as a result, can improve rate-distortion performance.

In one example embodiment, step 140 includes steps 132, 134, 136, and 138. Steps 132 and 136 are the assessment of boundary strength for the left and upper boundaries, respectively. The boundary strength assessment determines what mode of deblocking applies, i.e. what type of filter is to be used. In step 134 and 138, the left and upper boundaries, respectively, are deblocked using the filter type indicated by the boundary strength assessment.

After the left and upper boundaries of the block i have been deblocked, the process 120 continues to step 142 where it assesses whether there are additional blocks to be processed in the frame. If so, then the index is incremented in step 144 and the process 120 returns to step 126. If not, then the reconstructed frame is output in step 146.

It will be appreciated that the same or a similar process to process 120 would be used in the encoder 10 (FIG. 1) to reconstruct the blocks used by the spatial predictor 21 (FIG. 1), except that no entropy decoding is required since the reconstruction loop begins before the entropy encoder 26 (FIG. 1).

In experiments, it has been found that application of in-loop deblocking to intra-coding results in the same distortion and a rate savings of 1-5% for a wide range of video clips, including foreman.cif, highway.cif, paris.cif, etc.

Balanced Distortion Quantization

In the discussion that follows, reference is made to DCT coefficients and the DCT domain; however, it will be appreciated that this application is not limited to DCTs specifically. The present application is more broadly applicable to block-based transforms.

The comparatively large distortion found at the boundaries for quantization in the DCT domain is caused by a worse weighted sum for reconstructing boundary pixels than for recovering interior pixels. Specifically, different DCT coefficients weight differently to the reconstruction in the pixel domain. Yet quantization applied to the DCT coefficients is uniform. Accordingly, the present application proposes to apply quantization for DCT coefficients adaptively so as to even out the distortion distribution among samples in the pixel domain.

For a given 4×4 block x with a prediction p, the residual is z=x−p. Uniform quantization carried out in the DCT domain may be represented as:

$$u_i = \mathrm{round}\!\left(\frac{c_i}{q} + \delta\right) \qquad (1.1)$$

where $c_i$ an element of c, which equals to t·z·t' with t being the 4×4 DCT matrix, $u_i$ the quantization output for $c_i$, q is the quantization step size, and δ denotes a rounding off parameter.

If we consider the quantization output of c as u, then the quantization error is c−u·q, while the reconstruction error for the present block in the pixel domain is z−t'·(u·q)·t. If it is measured by the Euclidean distance, the total quantization error in the DCT domain will be the same as that in the pixel domain as $\|c-u\cdot q\|^2 = \|z - t'\cdot(u\cdot q)\cdot t\|^2$, because DCT is a unitary transform. However, consider the reconstructed error for individual pixels in the whole block. The statistics of reconstruction errors for different pixels are very different from each other although the same quantizer is applied to all DCT coefficients.

Taking, for example, the 4×4 DCT, the present application proposes that sixteen distinct quantization step sizes would be selected; one for each of the DCT coefficient positions. The selection of the quantization step sizes is to be based on achieving an even distribution of distortion in the pixel domain.

The DCT coefficients may be defined as follows:

$$c = \begin{pmatrix} c_1 & c_2 & c_3 & c_4 \\ c_5 & c_6 & c_7 & c_8 \\ c_9 & c_{10} & c_{11} & c_{12} \\ c_{13} & c_{14} & c_{15} & c_{16} \end{pmatrix}$$

The coefficient positions are indexed using integers so as to facilitate later manipulations. The quantization steps sizes may be defined as a corresponding matrix q as follows:

$$q = \begin{pmatrix} q_1 & q_2 & q_3 & q_4 \\ q_5 & q_6 & q_7 & q_8 \\ q_9 & q_{10} & q_{11} & q_{12} \\ q_{13} & q_{14} & q_{15} & q_{16} \end{pmatrix}$$

We can formulate a constrained RD optimization problem to design quantizers q for quantizing c to make even the distortion distribution between boundary pixels and interior pixels, as follows:

$$\min_{q_1,\ldots,q_{16}} E\left(\sum_{i=1}^{i=16} (c_i - u_i \cdot q_i) + \lambda \cdot r(u_i, \ldots, u_{16})\right) \quad (1.2)$$

subject to $E(z_i - \hat{z}_i)^2 = D_0$, for $i = 1 \ldots 16$, where $z_i$ and $\hat{z}_i$ are elements of z and $\hat{z}$ respectively, with $z = t' \cdot c \cdot t$ and $\hat{z} = t' \cdot (u \odot q) \cdot t$, $E(\ )$ is the standard expectation operation, $D_0$ is the desired average distortion, $u_i$ is the output of quantizing $c_i$ using $q_i$ by Equation (1.1), $r(\cdot)$ represents a rate function for coding the quantization outputs, $\lambda$ is a constant, and $\lfloor$ means element-wise multiplication between matrixes.

Consider the unitary property of DCT for maintaining the Euclidean distance. Equation (1.2) can be rewritten as:

$$\min_q E(r(u_1, \ldots, u_{16})), \quad s.t. \quad E(z_i - \hat{z}_i)^2 = D_0, i = 1 \ldots 16 \quad (1.3)$$

In the following analysis we will assume an independent Gaussian distribution for the 4×4 DCT coefficients.

The formula in Equation (1.3) reflects a clear logic of developing scalar quantizers by using quantization step sizes as optimization variables. However it is difficult to solve this optimization. Consider that the quantization distortion is a monotonic function of the quantization step size, a scalar quantizer. We may use quantization distortion as the optimization variable; specifically, we are looking to design sixteen quantizers based on $\{D_1, \ldots, D_{16}\}$, wherein $D_i$ denotes the quantization distortion for the ith quantizer with its step size $q_i$. By assuming independent Gaussian distribution with $N(0, \sigma_i^2)$ for $c_i$, we further use the rate-distortion function for a Gaussian source to replace the rate function in Equation (1.3):

$$\min_{D_1,\ldots,D_{16}} \sum_i \log\frac{\sigma_i^2}{D_i}, \quad s.t. \quad E(z_i - \hat{z}_i)^2 = D_0, i = 1 \ldots 16 \quad (1.4)$$

Consider that $z = t' \cdot c \cdot t$ and $\hat{z} = t' \cdot (u \lfloor q) \cdot t$. The inverse transform can be rewritten in a one-dimensional format as:

$$\begin{pmatrix} z_1 - \hat{z}_1 \\ \vdots \\ z_{16} - \hat{z}_{16} \end{pmatrix} = A \cdot \begin{pmatrix} c_1 - u_1 \cdot q_1 \\ \vdots \\ c_{16} - u_{16} \cdot q_{16} \end{pmatrix} \quad (1.5)$$

where A is a constant matrix related to t. In particular, the matrix A is a one-dimensional version of the inverse transform. Equation (1.5) relates the quantization distortion in the pixel domain (e.g. $z_1 - \hat{z}_1$) to quantization distortion in the DCT domain (e.g. $c_1 - u_1 \cdot q_1$), through the one-dimensional inverse transform matrix A.

Consider that $D_i = E(c_i - u_i \cdot q_i)^2$. After some derivation, the constraints in Equation (1.4) become:

$$(A \odot A) \cdot \begin{pmatrix} D_1 \\ \vdots \\ D_{16} \end{pmatrix} = \begin{pmatrix} D_0 \\ \vdots \\ D_0 \end{pmatrix} \quad (1.6)$$

which represents sixteen linear constraints on $\{D_i\}$.

To summarize, the quantization design problem becomes:

$$\min_{D_1,\ldots,D_{16}} \sum_i \log\frac{\sigma_i^2}{D_i}, \quad s.t. \text{ Equation (1.6) and } D_i < \sigma_i^2 \quad (1.7)$$

which is a convex minimization problem that can be solved using standard technique for convex minimizations.

It should be noted that the foregoing discussion refers to the average pixel domain distortion $D_0$; however, as will be appreciated from Equation (1.6), the distortion may be more broadly considered a vector. Equation (1.6) represents the special case of average pixel domain distortion. In some other cases, the desired distortion may not be expressed as average pixel domain distortion. For example, in some cases it may be desirable to have lower distortion at the edges of a block of pixels than in the center, or in another example, it may be desirable to have lower distortion at particular edges of a block, such as those edges used in spatial prediction. The desired pixel domain distortion may be specified to accommodate those situations within the context of Equations (1.6) and (1.7).

In contrast to the optimization problem in Equation (1.7), the conventional quantization design in the DCT domain, either for image compression like in JPEG or for video coding like in H.264, is subject to a sum distortion constraint. With the assumption that the DCT coefficients are emitted from independent Gaussian sources, the solution in conventional quantization design gives rise to the so-called reverse "water-filling": the resulting distortion is a constant D except for sources with variances smaller than D. In other words, the resulting quantization distortion is distributed as evenly as possible in the DCT domain, but not necessarily in the pixel domain.

In the present case, however, the solution to Equation (1.7) specifies scalar quantizers by their DCT distortions, and the DCT distortion for each coefficient position is selected on the basis of achieving desired distortion $D_0$ in the pixel domain. The DCT domain quantization distortions which need to be converted to quantization step sizes in order to be used in the coding procedure. In general, the function of D(q) may be too complicated to derive its inverse function. For high-rate scalar quantization cases, there are some results with a simple formula for D(q). Yet, here we do not necessarily have a valid high-rate assumption. In one embodiment of the present application, the monotonicity of D(q) is utilized to solve the inversion problem empirically. Specifically, for a given value of D(q) and an initial value of $q_0$, a generic gradient descent algorithm is used to search for the corresponding q, by gradually modifying the present q towards the direction to achieve D(q). It will be appreciated that the search for a quantization step size q may continue until the resulting D(q) reaches a value sufficiently close to the prescribed $D_i$ for that coefficient. In other words, a threshold range may be used to determine when the quantization step size is "close enough" to realizing the desired $D_i$. It will also be understood that in some embodiments, the step sizes may be predetermined, meaning that there are a finite number of possible selections, which limits the ability to exactly realize $D_i$. One of those selections may be the closest to realizing $D_i$, but the actual distortion D(q) may differ from $D_i$ by a small amount. In the present description, it will be understood that references to a quantization step size that "realizes" the calculated quantization distortion $D_i$ include quantization step sizes that result in a distortion D(q) that is sufficiently close to, but not exactly, $D_i$.

Figure 7:
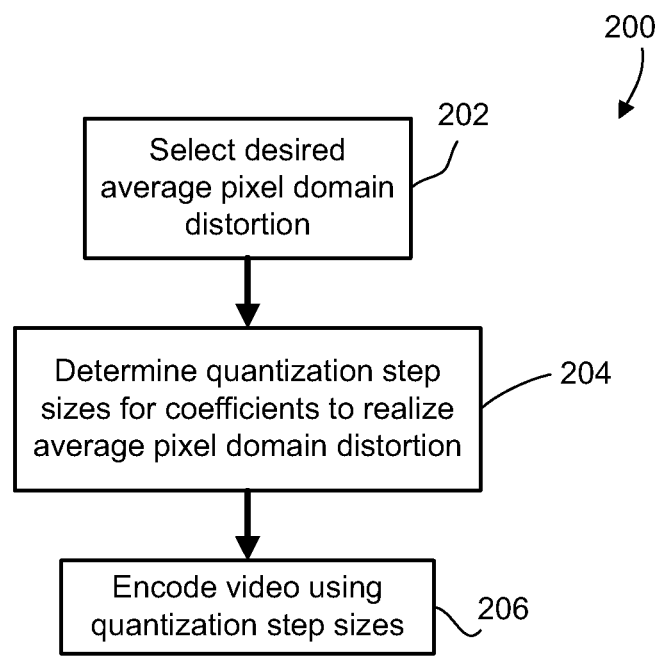
FIG. 7 shows, in flowchart form, an example method for encoding video.

Reference is now made to FIG. 7, which shows in flowchart form an example method 200 for encoding video. The method 200 applies the principles outlined above. In particular, at step 202 a desired average pixel domain distortion $D_0$ is selected. The selection may be based on a desired signal-to-noise ratio (SNR) or peak SNR (PSNR). For example, in one embodiment the average pixel domain distortion may be selected based on a known or assumed coefficient variance and a desired PSNR. In one embodiment, $D_0$ may be an adjustable quantity specified by user or based on a "quality" setting selected by a user or otherwise specified for the particular video or the particular video encoder.

In step 204, the quantization step sizes for each coefficient position in 4×4 MBs and/or 16×16 MBs are determined on the basis that they realize the desired average pixel domain distortion $D_0$. In the case of a 4×4 MB, sixteen quantization steps sizes are determined. The quantization step sizes for some coefficient positions may be the same in some instances. The determination of quantization step sizes may include selecting from available steps sizes for a particular encoding standard. For example, in H.264 there are 52 possible quantization step sizes. Other standards or profiles may permit more or fewer quantization step sizes.

Having selected the quantization step sizes for quantizing DCT coefficients for the video frame or slice, in step 206 the encoder processes the video frame or slice using the selected quantization step sizes in quantizing transform domain coefficients during the encoding process. The encoded frame is output from the encoder, as will be appreciated by those ordinarily skilled in the art.

Figure 8:
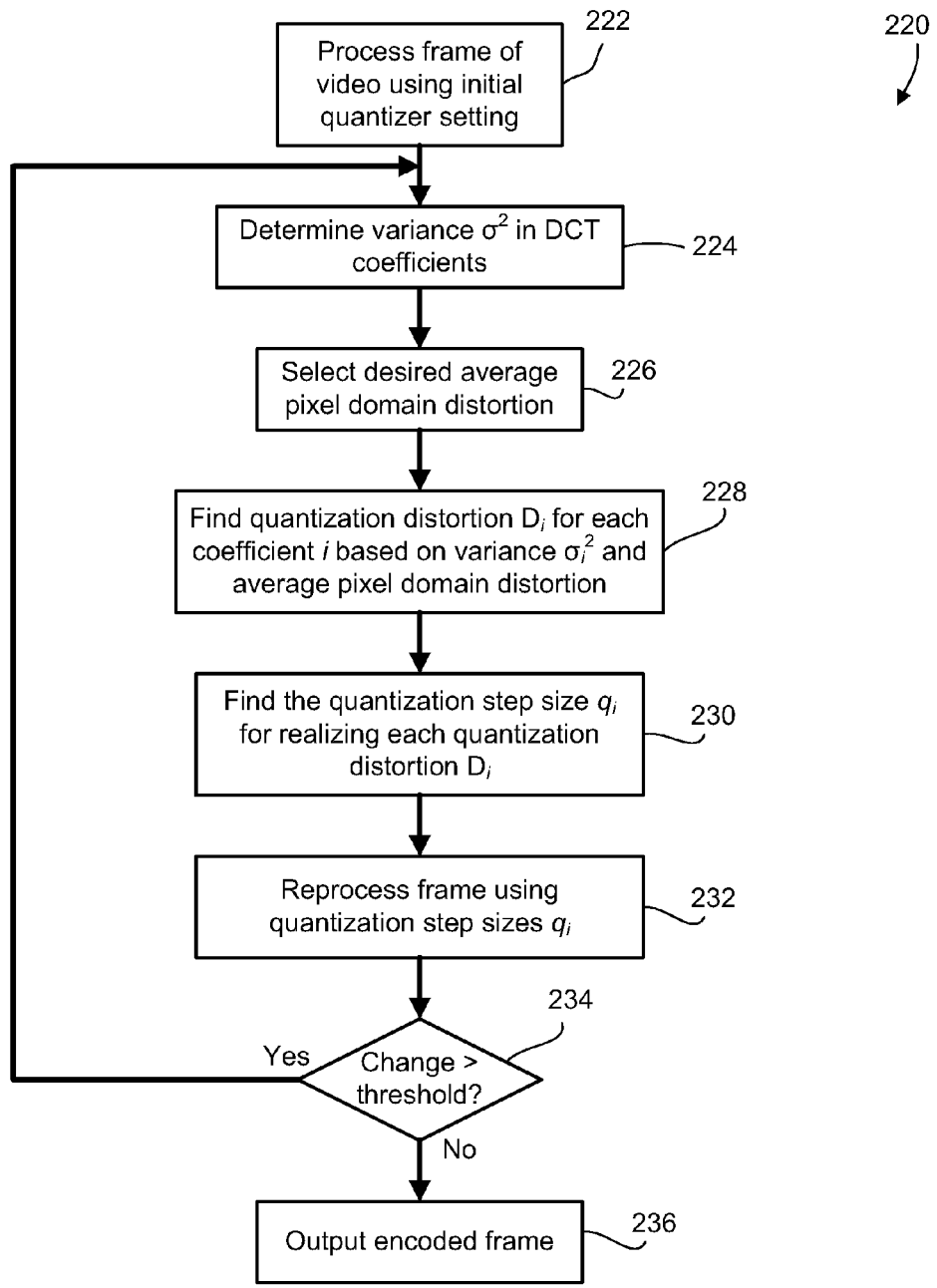
FIG. 8 shows, in flowchart form, another example method for encoding video.

Reference is now made to FIG. 8, which shows, in flowchart form, another example method 220 for encoding video. The example method 220 begins with step 222, which involves processing the frame of video to generate predictions and residuals for each macroblock. The residuals are transformed to obtain initial transform domain coefficients.

The processing employs an initial quantization step size $q_0$. The processing may be in accordance with a given standard, such as H.264. The processing may, in some embodiments, include applying in-loop deblocking as described above in connection with FIGS. 1 through 6. Step 220 may include applying block-wise RD optimization schemes in the computation of initial transform domain coefficients.

In step 224, the variances ($\sigma_1^2 \ldots \sigma_{16}^2$) of the initial transform domain coefficients in the coefficient positions are calculated based on the processing done in step 222. Note that in some embodiments, separate variances may be calculated for transform domain coefficients corresponding to I4×4 macroblocks and for transform domain coefficients corresponding to I16×16 macroblocks, since the statistics may be different for different sized macroblocks.

In step 226 the desired average pixel domain distortion $D_0$ is selected. As noted above in connection with FIG. 7, the selection may be based on a desired visual quality in terms of PSNR. The average pixel domain distortion $D_0$ may be selected or set for a particular video and used in connection with every frame (in which case, step 226 may only involve reading the preset value of $D_0$ from memory). The selection or setting of the average pixel domain distortion $D_0$ may be user-configurable. The encoder may provide the capability to set or adjust the average pixel domain distortion for encoding a particular video or portion of video. In some embodiments, the average pixel domain distortion may be selected for each frame based on a measure of statistics for the frame and may vary from frame-to-frame. By way of example, a user may directly specify the average pixel domain distortion $D_0$ if the user desires to achieve a certain type of visual quality in the reconstructed video and is cognizant of the impact $D_0$ may have upon quality. In another example, a user might specify another coding parameter, such as coding rate or quantization step sizes, and the encoder may run the encoding process to identify a particular resulting average pixel domain distortion $D_0$, which it may then use in re-running the encoding process with the empirical $D_0$ factor used to try to even out distortion. In some sense, $D_0$ is a free parameter. As noted above, in some embodiments, the desired pixel domain distortion may not be an average pixel domain distortion that is uniform across the block of pixels.

In step 228, the DCT domain quantization distortions $D_1 \ldots D_{16}$ for the coefficient positions are determined based on the variances $\sigma_1^2 \ldots \sigma_{16}^2$ for the coefficients in those coefficient positions and the desired average pixel domain distortion $D_0$. As noted above, the quantization distortions $D_1 \ldots D_{16}$ may be determined by solving the convex minimization problem defined in Equation 1.7, subject to the constraints of Equation 1.6 and the constraint $D_i < \sigma_i^2$. In one embodiment, by way of example, the convex minimization problem may be solved using the standard sequential quadratic programming method.

Having determined the quantization distortions $D_1 \ldots D_{16}$ needed to realize the desired average pixel domain distortion $D_0$, the quantization distortions $D_1 \ldots D_{16}$ are converted into quantization steps sizes $q_1 \ldots q_{16}$ in step 230. In other words, step 230 involves finding or selecting the quantization step size $q_i$ for realizing the quantization distortion $D_i$ determined in step 228. The quantization steps sizes $q_i$ may be selected from a predetermined set of available quantization step sizes. For example, H.264 specifies the quantization steps sizes that may be used. In at least one profile for H.264, there are 52 possible quantization step sizes. Accordingly, the quantization steps sizes $q_i$ may be selected on the basis that they best realize the quantization distortion $D_i$, subject to the constraint that they must be selected from the step sizes prescribed by an applicable encoding standard. As noted above, the selection or determination of the quantization step sizes may include using a standard gradient descent algorithm to search for a suitable (or optimal) step size. As noted above, in some embodiments separate 4×4 quantizers having separate quantization step size selections may be created for use with I4×4 macroblocks and I16×16 macroblocks. In this case the obtained quantization step sizes may be denoted as $q_{I4 \times 4}$ and $q_{I16 \times 16}$, respectively.

The relationship between quantization step size $q_i$ and quantization distortion $D_i$ is a monotonic function. In one embodiment, the process of finding the correct step size includes selecting an initial quantization step size value and then evaluating the resulting quantization distortion. If the distortion is too small compared to the desired quantization distortion calculated in step 228, then the quantization step size is increased until a suitable distortion results. A bisection search may be employed in some implementations.

Steps 224 through 230 are, collectively, the steps for creating a frame-specific quantizer for realizing balanced pixel domain distortion. The creation is based on the specific statistics of the frame being processed. In other words the quantizer designed for the specific frame of video is specifically tailored to ensure that the quantization distortion results in a balanced distortion in the pixel domain.

In step 232, the frame of video is re-processed (i.e. transformed, quantized, etc.) using the quantizer(s) created in steps 224-230. In other words, the re-processing of the frame in step 232 uses quantization step sizes $q_1 \ldots q_{16}$. In the case where different quantizers are used for different sized macroblocks, step 232 re-processes the frame using the $q_{I4 \times 4}$ and $q_{I16 \times 16}$ quantization step sizes. The re-processing may include applying in-loop deblocking, as described above.

In some embodiments, method 220 may be iterative, and thus may include step 234 in which the results of the re-processing are evaluated against a threshold to determine whether the maximal difference among distortion variances at different positions in the pixel domain was more than a threshold amount. If so, then steps 224 through 232 may be repeated to refine the selection of quantization step sizes. The reason the results of steps 224 through 230 may be sub-optimal is that there may be a mismatch between the DCT data set used to design quantizers and the actual DCT data that the obtained quantizers are applied to because of the block-based directional prediction scheme. In addition, the real data statistics may deviate from the Gaussian assumption underlying Equation 1.7. Accordingly, the variances resulting from the re-processing of the frame in step 232 may be used to refine the selection of the quantization steps sizes. In step 234 if the maximal difference among distortion variances at different positions in the pixel domain is less than a preselected threshold value, then the method 220 continues to step 236 where the encoded frame is output.

It will be appreciated that the encoding of the frame may include entropy coding the predictions and residuals data to generate a bitstream of encoded video. It will also be appreciated that the entropy coding may occur in step 232 or in step 236. A novel process for entropy coding, using revisited arithmetic coding will be described further below.

It will also be appreciated that step 236 may include transmitting the encoded bitstream from the encoder to a destination device, possibly over a wired or wireless communications path. The transmission may include point-to-point transmission or broadcast transmission. The output bitstream may also or alternatively be stored locally for later transmission or output, such as in a non-volatile memory. In one embodiment, it may be stored on a decoder-readable medium, such as a magnetic or optical disk.

It will also be understood that the bitstream output by the encoder includes the matrix of quantization step sizes found in step 230. In the case where different quantizers are used for different sized macroblocks both 4×4 matrices of quantization steps sizes, $q_{I4 \times 4}$ and $q_{I16 \times 16}$, are included in the bitstream. For each frame, the bitstream includes the quantization matrices applicable to that frame.

The encoding of the quantization step sizes in the bitstream may, in one embodiment, be done as follows. The steps sizes in this example are selected from the 52 available step sizes defined by H.264. First, a one-bit codeword is defined for the largest size. This is because it is very probable for a quantizer selected for a high frequency component to have a desired distortion that is the same as the source variance, meaning a quantization step size large enough to only generate 0 as the quantization output. In this case, only one bit is transmitted and the largest step size will be used by the decoder. For other quantization step sizes, four more bits are sent to the decoder. Specifically, denote a quantization step size corresponding to a given average distortion preference $D_0$ as $q_0$. Only 16 step sizes, denoted as $q_{-8}, \ldots, q_7$ will be used, where for example $q_{-8}$ means the step size which is 8 steps smaller than $q_0$ following the order of the 52 steps sizes. This coding scheme works well for coding CIF frames, taking less than 1% of the total rate for all CIF frames tested in experimentation.

More particularly, this example coding scheme may consider 17 different step sizes, $q_{large}$ and $q_{-8}, \ldots, q_7$. The parameter $q_{large}$ can be set to be the largest one in the 52 available steps sizes defined by H.264, while the other 16 step sizes are related to $q_0$. Essentially, $q_{large}$ accords to a one-bit codeword and $q_{-8}, \ldots, q_7$ accord to 16 5-bit codewords, i.e., four bits to differentiate among the 16 levels and one bit to differentiate from $q_{large}$.

It will be appreciated that this example coding scheme is but one of many possible coding schemes.

A decoder receives the bitstream and entropy decodes the bitstream to recover the quantization step sizes and the quantized transform domain coefficients. It then de-quantizes the quantized transform domain coefficients using the quantization step sizes specified for particular coefficient positions, to recover the transform domain coefficients. In some embodiments, the quantization step sizes are determined on a slice-by-slice or frame-by-frame basis. Accordingly, the quantization step sizes may be encoded once per frame or slice, as the case may be.

Figure 9:
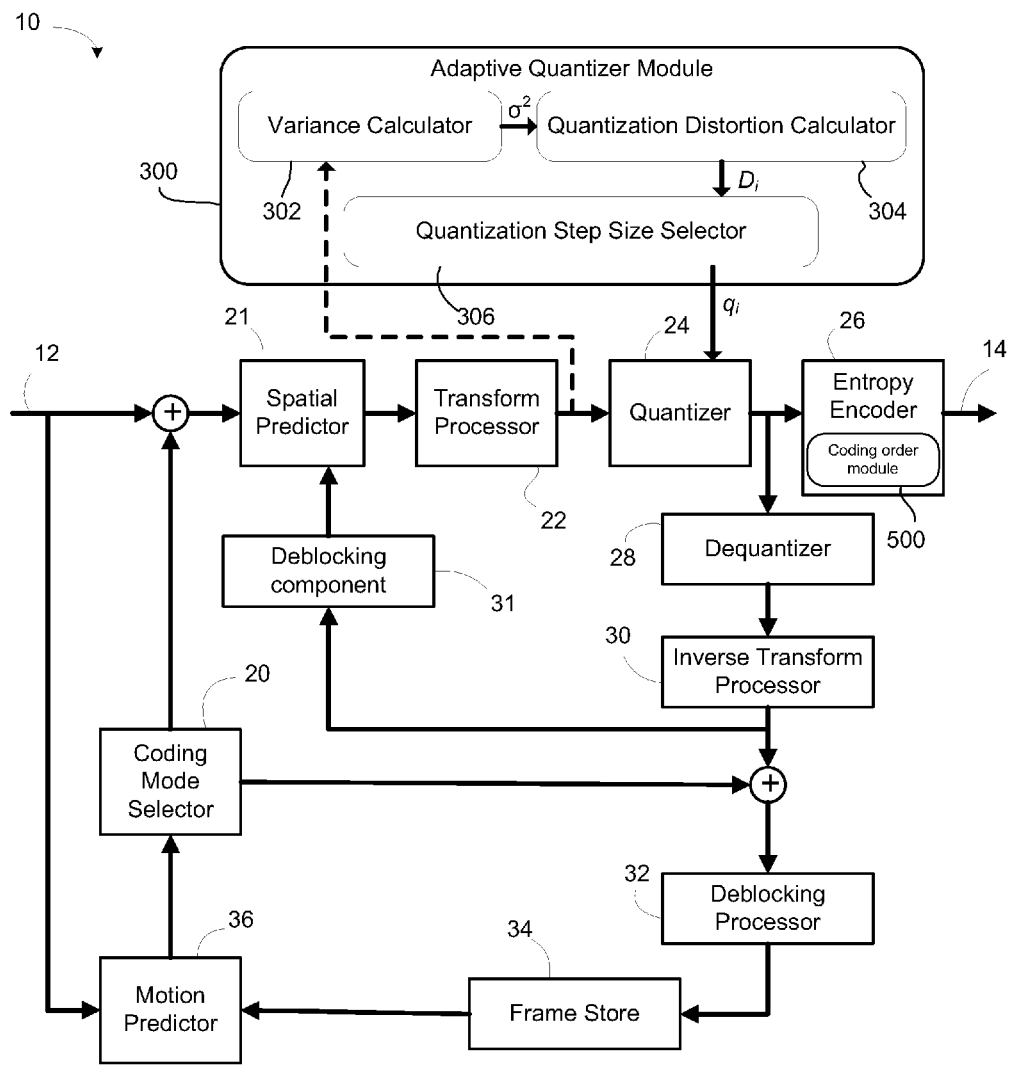
FIG. 9 shows a block diagram of the encoder with an adaptive quantizer module.

Reference will now be made to FIG. 9, which shows a block diagram of the encoder 10 with an adaptive quantizer module 300. The adaptive quantizer module 300 may be configured to implement the methods 200 or 220 described above. The adaptive quantizer module 300 includes a variance calculator 302 that determines the variance $\sigma^2$ for each DCT coefficient position that result from the initial processing of the frame, as described above in connection with step 224 (FIG. 8). The variance calculator 302 supplies the variance $\sigma^2$ information to the quantization distortion calculator 304, which is configured to determine the quantizaiton distortion $D_i$. Specifically, the quantization distortions $D_1 \ldots D_{16}$ for each coefficient position are determined based on the variances $\sigma_1^2 \ldots \sigma_{16}^2$ for each coefficient position and the desired average pixel domain distortion $D_0$. The adaptive quantizer module 300 further includes a quantization step size selector 306, which finds the quantization step sizes $q_1 \ldots q_{16}$ for best realizing the determined quantization distortions $D_1 \ldots D_{16}$. The selected quantization step sizes $q_1 \ldots q_{16}$ are then used by the quantizer 24 to reprocess the frame, as described above in conjunction with step 232 (FIG. 8).

Although illustrated as separate modules, components, or calculators for ease of description and discussion, it will be appreciated that many implementations are possible, depending on the encoder and the configuration of the software for realizing the encoding process.

Revised Context Modeling for Arithmetic Coding

The development of balanced distortion quantization results in different statistics for the quantization outputs. In addition, some of the assumptions that underlie the context modeling specified for H.264 are not necessarily valid in the case where quantization step size varies within a 4×4 transform block. In particular, the scanning or coding order specified by H.264 is based on the expected increasing likelihood of zero coefficient outputs when using uniform quantization. The terms "scanning order" and "coding order" are used interchangeably in the following discussion.

Figure 10:
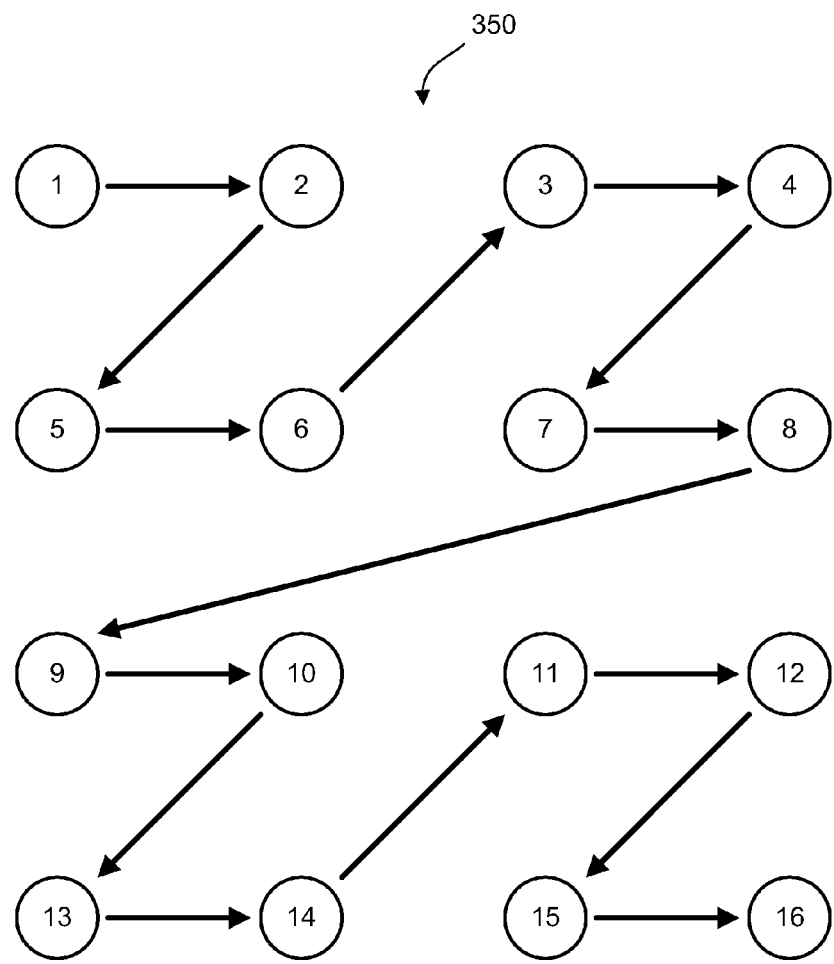
FIG. 10 illustrates the coding order specified by H.264 for a 4×4 block.

Reference is now made to FIG. 10, which illustrates the coding order 350 specified by H.264 for a 4×4 block. The numbering of the coefficient positions 1, ..., 16 follows a left-to-right, top-down order. Referring to the numbered coefficient positions, the prescribed scanning order in H.264 is 1, 2, 5, 6, 3, 4, 7, 8, 9, 10, 13, 14, 11, 12, 15, 16.

In accordance with one aspect of the present application, the coding order is determined dynamically on a frame-by-frame basis. In particular, the coding order is determined based on one or more characteristics or statistics acquired for the frame. For example, the coding order selected for a given frame may take into account the coefficient variance $\sigma^2$ information for the frame.

Figure 11:
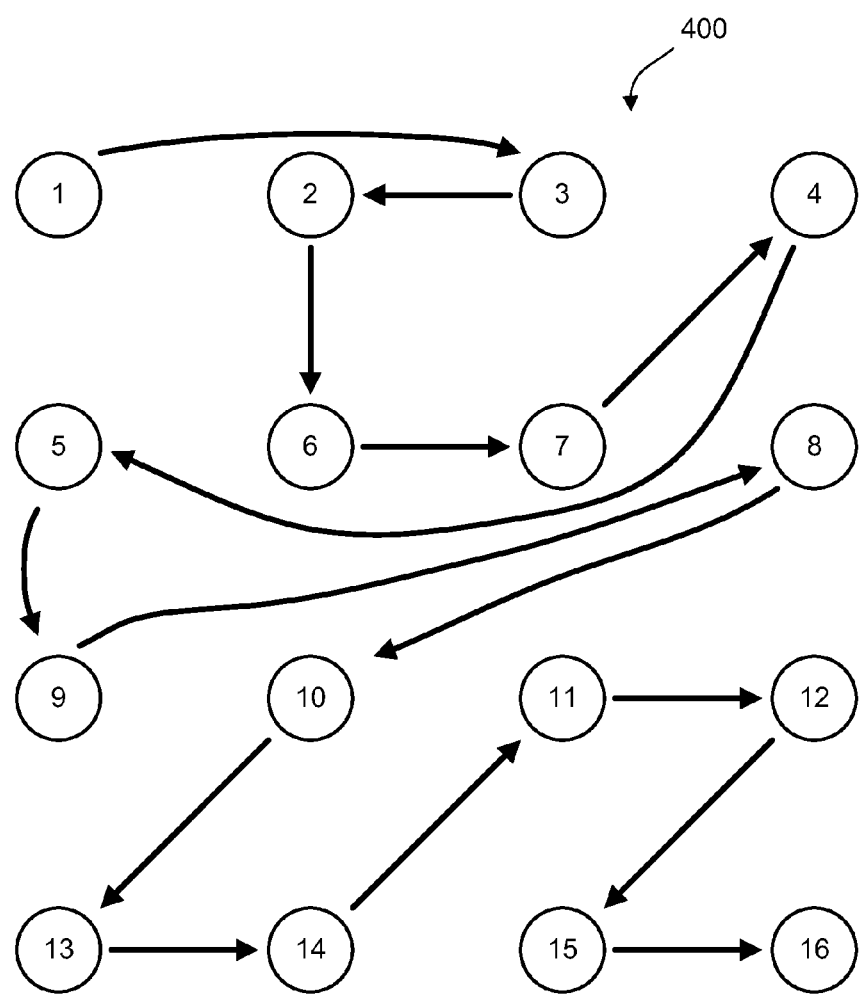
FIG. 11 illustrates an example dynamic coding order.

In one example, in which quantization step sizes are non-uniform, the coding order is determined on the basis of increasing quantization step size. To the extent that two or more coefficients share the same quantization step size, the order is based upon the original scanning order defined in H.264 and illustrated in FIG. 10. Reference is now made to FIG. 11, which illustrates an example dynamic coding order 400. In this example, the sixteen quantization steps sizes have been determined as follows (note that the subscripts follow a left-to-right, top-down order, and not the coding order):

$q_1$=0.8125
$q_2$=1.25
$q_3$=0.8125
$q_4$=1.75
$q_5$=2.5
$q_6$=1.25
$q_7$=1.25
$q_8$=4.5
$q_9$=4.0
$q_{10}$=224
$q_{11}$=224
$q_{12}$=224
$q_{13}$=224
$q_{14}$=224
$q_{15}$=224
$q_{16}$=224

Based on increasing quantization step size, the resulting coding order is illustrated in FIG. 11. The smallest quantization step size in this example is 0.8125, which is designated for coefficients 1 and 3. Because they have the same step size, the conflict is resolved with resort to the original scanning order, in which 1 is scanned prior to 3. The next step size is 1.25, which is shared by coefficients 2, 6, and 7. The original scanning order provides that 2 is scanned before 6, which is scanned before 7, meaning that these three coefficients are scanned in the order 2, 6, 7. Then the next step size is 1.75, which is only applicable to coefficient 4, so it is next. When processed in this manner, the resulting scanning order for the example is: 1, 3, 2, 6, 7, 4, 5, 9, 8, 10, 13, 14, 11, 12, 15, 16.

Other factors may be relied upon in selecting the coding order, instead of or in addition to quantization step size $q_i$.

Figure 12:
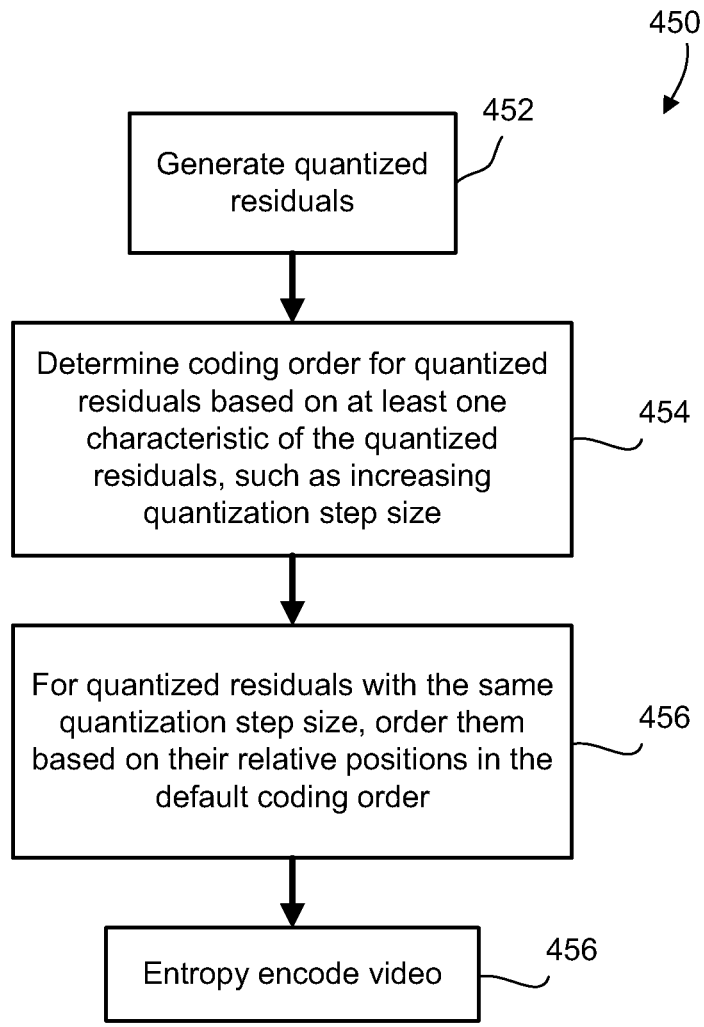
FIG. 12 shows, in flowchart form, a method of entropy coding quantized residuals in a video encoding process.

Reference is now made to FIG. 12, which shows, in flowchart form, a method 450 of entropy coding quantized residuals in a video encoding process. The method 450 begins in step 452 with the generation of quantized residuals $u_i$. In step 454 the quantized residuals are ordered based upon increasing quantization step size. In other words, the quantized residuals that were quantized using the smallest quantization step size are positioned first in the order, while those quantized using the largest quantization step size are positioned last in the order. If any of the quantized residuals were quantized using the same quantization step sizes then in step 456 they are ordered based on their relative positions in the original scanning order prescribed by the applicable encoding standard, such as H.264. Once an order has been determined, then in step 458 the quantized residuals are entropy encoded using the determined order. Reference is now also made to FIG. 9, which shows the entropy encoder 26 includes a coding order module 500. The coding order module 500 selects or determines the coding order for a given frame using, for example, the method 450 shown in FIG. 12.

Contexts for the significant map and the last coefficient flag are enhanced to include three prediction directions, i.e., left-to-right, top-down, and omni-direction, besides using the position information. For an I4×4 macroblock, the left-to-right direction accords to prediction modes 1, 6 and 8, while the top-down direction is for prediction modes 0, 3, 5, and 7. Other modes are counted as omni-direction. For an I16×16 macroblock, the left-to-right direction accords to prediction mode 1, the top-down direction is for prediction mode 0, and other prediction modes are treated as the omni-direction.

Contexts for coding non-zero quantization outputs, also called levels, are modified to include combinations of two more parameters, bLmax and bNumLg1, which are defined as follows:

$$bNumLg1 = \begin{cases} 0, & Lg1 \in |0, 1| \\ 1, & Lg1 \in |2, 3| \\ 2, & o.w. \end{cases}, bL\max = \begin{cases} 0, & Lm \in |0, 2| \\ 1, & Lm \in |3, 4| \\ 2, & o.w. \end{cases}$$

where Lg1 is the number of levels whose magnitudes are greater than 1, and Lm is the maximum magnitude of all previously coded levels. Eventually, a level with a given context is coded using a multi-symbol arithmetic coding engine.

Although the development of balanced distortion quantization motivated the revisiting of context modeling, the use of the revised encoding method is not limited to embodiments in which balanced distortion quantization is employed. It will be appreciated that the revised context modeling may be applied in other circumstances. Those skilled in the art will understand that the revised context modeling is particularly applicable to any encoding process in which quantization step size is not uniform; although it is not limited to that situation.

The encoded data may be output as a bitstream of encoded data or stored on a computer-readable medium. The encoded data may be transmitted to a remote location, for example over a wired or wireless communication network.

Video or image data encoded in accordance with the entropy encoding method described above is decoded by a decoder configured to apply a corresponding decoding method. If the encoder used an adaptive coding order as described above, the decoder needs to know the coding order in order to decode the data and arrange the quantized transform domain coefficients in the correct order for subsequent de-quantization and inverse transformation. Accordingly, the decoder determines the coding order for coding data. To the extent that the coding order was determined by the encoder on a frame-by-frame basis, the decoder identifies/determines and applies the same coding order for decoding the data on a frame-by-frame basis.

In order for the decoder to determine the coding order, it receives some data from the encoder relating to the coding order, i.e. coding order data. In one example embodiment, the encoder adds or embeds coding order data to the bitstream of encoded data. In another example embodiment, the coding order data is sent as side information outside the bitstream; however, in this embodiment the decoder also receives correlation information that enables the decoder to correlate the coding order data to the encoded data such that it applies the coding order data to determining the coding order for the correct portion of the encoded data. In the case of the first embodiment, the coding order data may be embedded within the bitstream before sending each frame or slice of encoded data; thereby enabling the decoder to recover or extract the coding order data from the bitstream and determine the applicable coding order before attempting entropy decoding of the encoded data for the corresponding frame or slice.

The coding order data may include information specifying the coding order itself. For example, the coding order data may include data indicating in which order the sixteen coefficients of a 4×4 transform block were encoded, in either a forward direction or a backward direction. In another example, the coding order data may include data from which the decoder can determine the coding order. In such an example, the decoder performs an identical process to that performed by the encoder in determining the coding order.

In one example embodiment, wherein the encoder determines the coding order on the basis of the quantization step sizes applied to respective coefficients, the coding order data may include the quantization step size information for the respective coefficients. In this regard, the coding order data is the quantization step size data sent in the bitstream to enable the decoder to correctly de-quantize the quantized transform domain coefficients. The decoder uses the quantization step size information to determine the coding order used to entropy encode the quantized transform domain coefficients.

Figure 15:
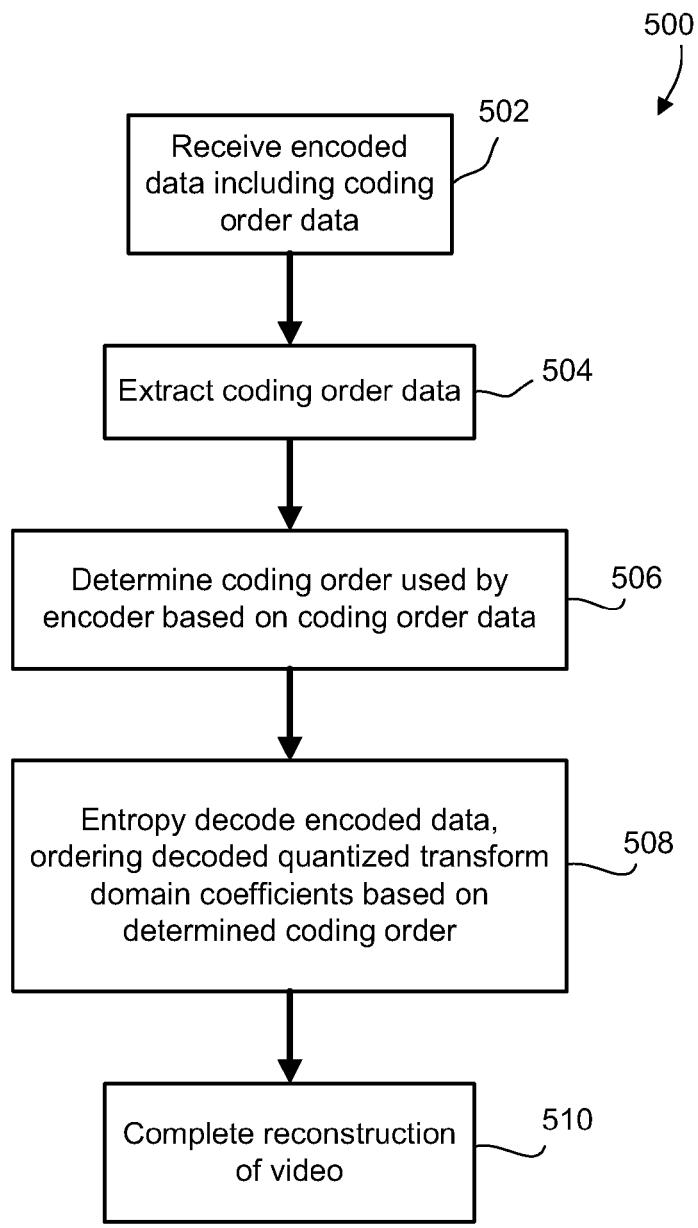
FIG. 15 shows, in flowchart form, a method of decoding encoded data.

Reference is now made to FIG. 15, which shows a method 500 of decoding encoded data. The encoded data includes quantized transform domain coefficients entropy encoded using a coding order determined dynamically on a frame-by-frame or slice-by-slice basis. The encoded data includes coding order data inserted into the encoded data. In step 502, the decoder receives the encoded data. This may occur as a result of receipt of the encoded data via a communications system. The encoded data may be in the form of a bitstream transmitted over a wired or wireless network. In another example, the encoded data may be stored on a computer-readable medium, such as a magnetic or optical disk, and may be read from the medium by the decoder in step 502.

In step 504, the decoder extracts the coding order data from the encoded data. The coding order data may include explicit information detailing the coding order used to entropy encode the quantized transform domain coefficients in some embodiments. In other embodiments, the coding order data may include data from which the decoder may determine the coding order used. For example, the coding order data may include quantization step sizes used for respective coefficients of the blocks of the quantized transform domain coefficients, and the coding order may be determined on the basis of quantization step size. In one case, the coding order may based on increasing quantization step size. Step 506 indicates the action of determining the coding order.

In step 508, the decoder proceeds to entropy decode the encoded data to recover the quantized transform domain coefficients in the order specified by the coding order determined in step 506.

In step 510, the decoder proceeds to complete reconstruction of the pixel data for the video, for example by de-quantizing and inverse transforming the quantized transform domain coefficients to create reconstructed residual data, applying spatial or motion compensation as required, and outputting reconstructed frames/slices.

Figure 13:
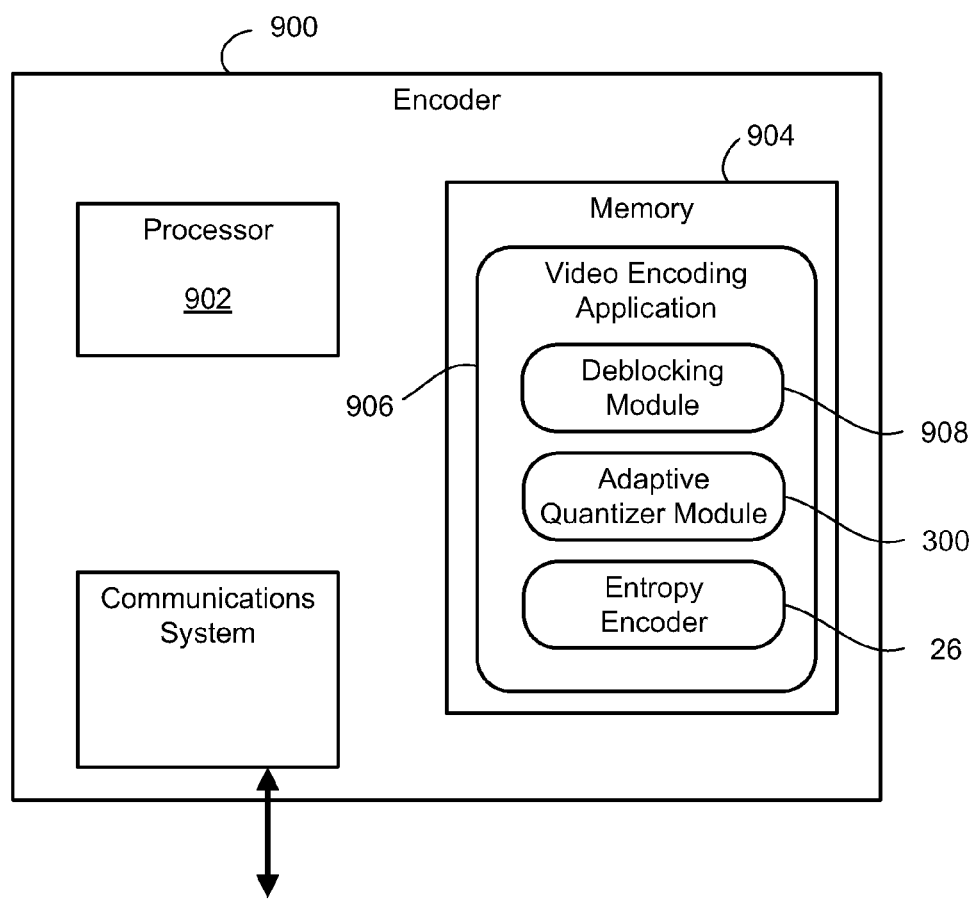
FIG. 13 shows a simplified block diagram of an example embodiment of an encoder.

Reference now made to FIG. 13, which shows a simplified block diagram of an example embodiment of an encoder 900. The encoder 900 includes a processor 902, memory 904, and an encoding application 904. The encoding application 906 may include a computer program or application stored in memory 904 and containing instructions for configuring the processor 902 to perform steps or operations such as those described herein. For example, the encoding application 906 may encode and output video bitstreams encoded using the H.264 standard. The encoding application 906 may include an in-loop deblocking component or module 908 configured to perform in-loop deblocking of intra-coded blocks in within a feedback loop. The encoding application 906 may include an adaptive quantizer module 300 configured to adaptively select quantization steps sizes for coefficients on a frame-by-frame basis, as described herein. The encoding application 906 may include an entropy encoder 26 configured to entropy encode quantized residuals and other data using a revised context model, as described herein. It will be understood that the encoding application 906, the deblocking module 908, the adaptive quantizer module 300, and/or the entropy encoder 26 may be stored in on a computer readable medium, such as a compact disc, flash memory device, random access memory, hard drive, etc.

Figure 14:
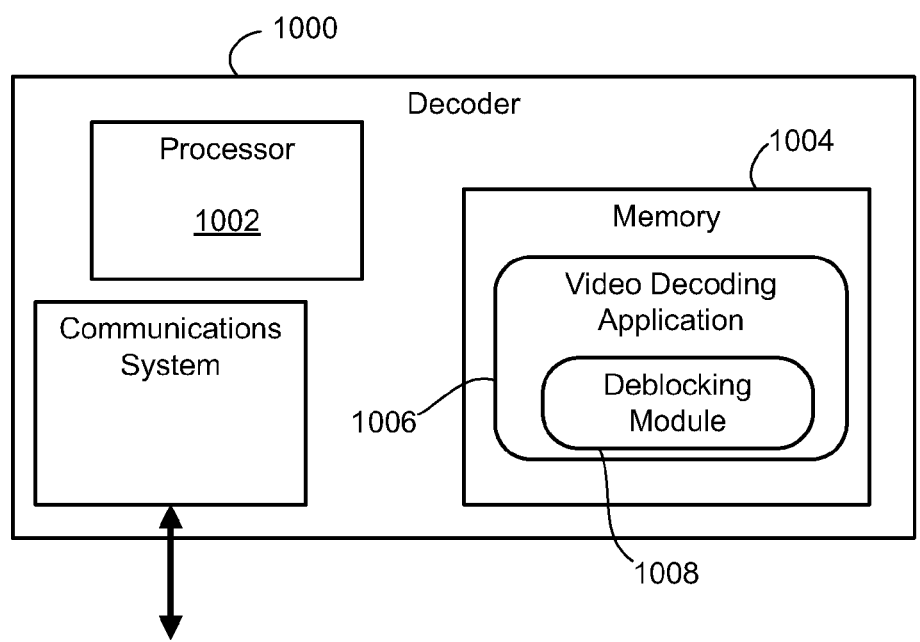
FIG. 14 shows a simplified block diagram of an example embodiment of a decoder.

Reference is now also made to FIG. 14, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. For example, the decoding application 1006 may decode and display video bitstreams encoded using the H.264 standard. The decoding application 1006 may include an in-loop deblocking component or module 1008 configured to perform in-loop deblocking of intra-coded blocks. It will be understood that the decoding application 1006 and/or the deblocking module 1008 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

In one aspect, the present application describes a method for encoding an image using an encoder, wherein the encoder is configured to apply block-based coding to the image. The method includes applying a spectral transformation to a block to generate a transform domain coefficients; selecting a quantization step size for each of the coefficients, wherein the selection is based on realizing a predetermined average pixel domain distortion within the block when decoded; quantizing each of the transform domain coefficients using its respective selected quantization step size; encoding the quantized coefficients to generate a bitstream of image data; and outputting the bitstream.

In a further aspect, the present application describes an encoder for encoding an image. The encoder includes a processor; a memory storing the image; a communications system for outputting a bitstream of encoded image data; and an encoding application stored in memory and containing instructions for configuring the processor to apply block-based coding to the image. The encoding application includes a transform processor configured to apply a spectral transformation to a block to generate a transform domain coefficients; an adaptive quantizer module configured to select a quantization step size for each of the coefficients, wherein the selection is based on realizing a predetermined average pixel domain distortion within the block when decoded; a quantizer configured to quantize each of the transform domain coefficients using its respective selected quantization step size; and an entropy encoder configured to encode the quantized coefficients to generate the bitstream of encoded image data.

In another aspect, the present application describes a method for encoding an image using an encoder, wherein the encoder is configured to apply block-based coding to the image. The method includes, for a block of the image, applying a spectral transformation to the block to generate a transform domain matrix of coefficients; quantizing the coefficients using a quantization matrix, wherein the elements of the quantization matrix are selected based on a predetermined uniform distortion distribution within the block decoded in the pixel domain; and encoding the quantized coefficients.

In another aspect, the present application discloses a method for decoding an intra-coded image using a decoder, the image having a plurality of blocks. The method includes receiving a bitstream of data encoding the intra-coded image; reconstructing pixel data for a block of the image from the bitstream of data; applying a deblocking filter to the reconstructed pixel data for the block to produce a deblocked reconstructed block; and reconstructing pixel data for a subsequent block of the image from the bitstream of data and a prediction computation based on at least one deblocked pixel from the deblocked reconstructed block.

In yet another aspect, the present application describes a method for encoding an image using an encoder. The image has a plurality of blocks and the encoder is configured to apply block-based coding to the blocks of the image in a coding order, and a reconstruction of a block within the image is used in a prediction computation when coding a subsequent block in the coding order within the image. The method includes applying a deblocking filter to the reconstructed block of the image within an intra-coding loop such that the deblocking of the block occurs prior to the prediction computation for the subsequent block.

In another aspect, the present application describes an encoder for encoding an image, wherein the image has a plurality of blocks. The encoder includes a processor; a memory storing the image; a communications system for outputting a bitstream of encoded image data; and an encoding application stored in memory and containing instructions for configuring the processor to apply block-based coding to the blocks of the image in a coding order, and wherein a reconstruction of a block within the image is used in a prediction computation when coding a subsequent block in the coding order within the image. The encoding application includes a deblocking component configured to apply a deblocking filter to the reconstructed block of the image within an intra-coding loop such that the deblocking of the reconstructed block occurs prior to the prediction computation for the subsequent block.

In yet a further aspect, the present application provides a decoder for decoding an intra-coded image, wherein the image has a plurality of blocks. The decoder includes a processor; a communications system for receiving a bitstream of data encoding the intra-coded image and outputting a decoded image; and an decoding application stored in memory and containing instructions for configuring the processor to apply block-based decoding to reconstruct pixel data for a block of the image from the bitstream. The decoding application includes a deblocking module configured to apply a deblocking filter to the reconstructed pixel data for the block to produce a deblocked reconstructed block. The decoding application is configured to reconstruct pixel data for a subsequent block of the image from the bitstream of data and a prediction computation based on at least one deblocked pixel from the deblocked reconstructed block.

In still a further aspect, the present application provides a method for entropy encoding an image in an encoder, wherein the image contains a plurality of blocks of pixels, and wherein the encoder converts each of the blocks to a prediction and a block of quantized transform domain coefficients. The method includes determining a coding order for the blocks of quantized transform domain coefficients, wherein the coding order is determined based on at least one characteristic of the quantized transform domain coefficients; entropy encoding each of the blocks of quantized transform domain coefficients in the coding order determined for the image to generate a bitstream of encoded image data; and outputting the bitstream.

In yet another aspect, the present application provides an encoder for encoding an image, wherein the image contains a plurality of blocks of pixels. The encoder includes a processor; a memory storing the image; a communications system for outputting a bitstream of encoded image data; and an encoding application stored in memory and containing instructions for configuring the processor to convert each of the blocks to a prediction and a block of quantized transform domain coefficients. The encoding application includes a coding order module configured to determine a coding order for the blocks of quantized transform domain coefficients, wherein the coding order is determined based on at least one characteristic of the quantized transform domain coefficients, and wherein the encoding application is configured to entropy encode each of the blocks of quantized transform domain coefficients in the coding order determined for the image by the coding order module to generate the bitstream.

In one aspect, the present application provides a method for block-based encoding of an image having a plurality of blocks of pixels. The method includes selecting a quantization step size for each coefficient position of a block-based transform, wherein the selection is based on realizing a predetermined pixel domain distortion per block of pixels; applying the block-based transform to each of the blocks of pixels to generate a set of transform domain coefficients for each block of pixels; for each set of transform domain coefficients, quantizing each of the transform domain coefficients using the selected quantization step size for that transform domain coefficient's coefficient position to produce a quantized coefficient; and encoding the quantized coefficients to generate a bitstream of encoded image data.

In another aspect, the present application provides an encoder for encoding an image having a plurality of blocks of pixels. The encoder includes a processor; a memory storing the blocks of pixels; and an encoding application stored in memory and containing instructions for configuring the processor to encode the image by selecting a quantization step size for each coefficient position of a block-based transform, wherein the selection is based on realizing a predetermined pixel domain distortion per block of pixels when decoded, applying the block-based transform to each of the blocks of pixels to generate a set of transform domain coefficients for each block of pixels, for each set of transform domain coefficients, quantizing each of the transform domain coefficients using the selected quantization step size for that transform domain coefficient's coefficient position to produce a quantized coefficient, and encoding the quantized coefficients to generate a bitstream of encoded image data.

In a further aspect, the present application provides a method of decoding encoded data, wherein the encoded data includes an image having a plurality of blocks of pixel data. The method includes entropy decoding the encoded data to obtain a set of quantized transform domain coefficients for each block of pixel data, and to obtain a quantization step size for each coefficient position of a block-based transform; for each set of quantized transform domain coefficients, de-quantizing each of the quantized transform domain coefficients using the quantization step size for that quantized transform domain coefficient's coefficient position to produce a transform domain coefficient; and inverse transforming the transform domain coefficients to reconstruct the blocks of pixel data.

In yet a further aspect, the present application describe a decoder for decoding encoded data, wherein the encoded data includes an image having a plurality of blocks of pixel data. The decoder includes a processor; a memory; and a decoding application stored in memory and containing instructions for configuring the processor to decode the encoded data by entropy decoding the encoded data to obtain a set of quantized transform domain coefficients for each block of pixel data, and to obtain a quantization step size for each coefficient position of a block-based transform, for each set of quantized transform domain coefficients, de-quantizing each of the quantized transform domain coefficients using the quantization step size for that quantized transform domain coefficient's coefficient position to produce a transform domain coefficient, and inverse transforming the transform domain coefficients to reconstruct the blocks of pixel data.

In yet another aspect, the present application describes a method for decoding encoded data, wherein the encoded data includes an intra-coded image having a plurality of blocks of pixels. The method includes reconstructing pixel data for a block of the image from the encoded data; applying a deblocking filter to the reconstructed pixel data for the block to produce a deblocked reconstructed block; and reconstructing pixel data for a subsequent block of the image from the encoded data and a prediction computation based on at least one deblocked pixel from the deblocked reconstructed block.

In a further aspect, the present application provides a method for block-based encoding of an image having a plurality of blocks in a coding order, and wherein a reconstruction of a block within the image is used in a prediction computation when encoding a subsequent block in the coding order within the image. The method includes applying a deblocking filter to the reconstructed block of the image within an intra-coding loop such that the deblocking of the block occurs prior to the prediction computation for the subsequent block.

In another aspect, the present application provides an encoder for encoding an image having a plurality of blocks. The encoder includes a processor; a memory storing the image; and an encoding application stored in memory and containing instructions for configuring the processor to apply block-based encoding to the blocks of the image in a coding order, and wherein a reconstruction of a block within the image is used in a prediction computation when encoding a subsequent block in the coding order within the image, the encoding application including a deblocking component configured to apply a deblocking filter to the reconstructed block of the image within an intra-coding loop such that the deblocking of the reconstructed block occurs prior to the prediction computation for the subsequent block.

In yet another aspect, the present application describes a decoder for decoding encoded data, wherein the encoded data includes an intra-coded image having a plurality of blocks of pixels. The decoder includes a processor; a memory; and an decoding application stored in the memory and containing instructions for configuring the processor to reconstruct pixel data for the block of the image from the encoded data, apply a deblocking filter to the reconstructed pixel data for the block to produce a deblocked reconstructed block, and reconstruct pixel data for a subsequent block of the image from the encoded data and a prediction computation based on at least one deblocked pixel from the deblocked reconstructed block.

In yet a further aspect, the present application describes a method for entropy encoding an image having a plurality of blocks of pixels, wherein each of the blocks has been converted to a prediction and a block of quantized transform domain coefficients. The method includes determining a coding order in which the quantized transform domain coefficients of each block are to be entropy encoded, wherein the coding order is determined based on at least one characteristic of the quantized transform domain coefficients; and entropy encoding the quantized transform domain coefficients in the coding order determined to generate a bitstream of encoded image data.

In another aspect, the present application discloses an encoder for encoding an image having a plurality of blocks of pixels. The encoder includes a processor; a memory storing the image; and an encoding application stored in memory and containing instructions for configuring the processor to convert each of the blocks to a prediction and a block of quantized transform domain coefficients, determine a coding order in which the quantized transform domain coefficients of each block are to be entropy encoded, wherein the coding order is determined based on at least one characteristic of the quantized transform domain coefficients, and entropy encode the quantized transform domain coefficients in the coding order determined to generate a bitstream of encoded image data.

In a further aspect, the present application describes a method for entropy decoding encoded data, wherein the encoded data includes a prediction and a block of quantized transform domain coefficients for each block of pixels of an image. The method includes extracting coding order data from the encoded data; determining a coding order in which the quantized transform domain coefficients of each block were entropy encoded, wherein the coding order is determined based on the coding order data; and entropy decoding the encoded data to recover the quantized transform domain coefficients in the coding order.

In yet a further aspect, the present application describes a decoder for decoding encoded data, an image, wherein the encoded data includes a prediction and a block of quantized transform domain coefficients for each block of pixels of an image. The encoder includes a processor; a memory for storing the image; and an encoding application stored in memory and containing instructions for configuring the processor to extract coding order data from the encoded data; determine a coding order in which the quantized transform domain coefficients of each block were entropy encoded, wherein the coding order is determined based on the coding order data; and entropy decode the encoded data to recover the quantized transform domain coefficients in the coding order.

Certain adaptations and modifications of the described embodiments can be made. Therefore, the above discussed embodiments are considered to be illustrative and not restrictive.

What is claimed is:

1. A method for block-based encoding of an image having a plurality of blocks of pixels, using a video encoder, the method comprising:
processing the image using an initial quantization step size to obtain predictions and residuals for each of the blocks of pixels;
transforming the respective residuals to obtain initial transform domain coefficients for each of the blocks of pixels;
calculating a variance for each coefficient position across all the initial transform domain coefficients;
determining a quantization distortion for each coefficient position in a block, based on a predetermined pixel domain distortion, by selecting the quantization distortions based on the variances for the coefficient positions, subject to linear constraints on the quantization distortions, wherein the linear constraints are based upon the predetermined pixel domain distortion;
selecting a quantization step size for each coefficient position in the block, based on the quantization distortion for that coefficient position;
applying the block-based transform to each of the blocks of pixels to generate a set of transform domain coefficients for each block of pixels;
for each set of transform domain coefficients, quantizing each of the transform domain coefficients using the selected quantization step size for that transform domain coefficient's coefficient position to produce a quantized coefficient; and
encoding the quantized coefficients to generate a bitstream of encoded image data.

2. The method claimed in claim 1, wherein the predetermined pixel domain distortion comprises the average pixel domain distortion per block, and wherein determining the quantization distortion for each coefficient position includes solving the convex minimization problem defined as $$\min_{D_1,\ldots,D_n} \sum_i \log\frac{\sigma_i^2}{D_i} \text{ subject to } (A \odot A) \cdot \begin{pmatrix} D_1 \\ \vdots \\ D_n \end{pmatrix} = \begin{pmatrix} D_0 \\ \vdots \\ D_0 \end{pmatrix}$$

and subject to $D_i < \sigma_i^2$,
where $D_0$ is the predetermined average pixel domain distortion, $D_i$ is the quantization distortion of coefficient position i, i is an index of the $1, \ldots, n$ coefficients in the set of transform domain coefficients, $\sigma_i^2$ is the variance of the initial transform domain coefficients in the ith coefficient position, and A is a one-dimensional spectral transform matrix.

3. The method claimed in claim 1, wherein selecting the quantization step size based on the quantization distortion includes empirically searching for the quantization step size using a gradient descent algorithm until the corresponding quantization distortion is realized within a threshold range.

4. The method claimed in claim 1, wherein the steps of calculating the variance, selecting quantization step size, and quantizing are repeated until a threshold value is met.

5. The method claimed in claim 1, wherein selecting is performed once for the image, and wherein the selected quantization step sizes for the respective coefficient positions are used to quantize corresponding transform domain coefficients in those respective coefficient positions of each set of transform domain coefficients obtained from transforming the blocks of pixels from the image.

6. The method claimed in claim 1, wherein the pixel domain distortion is preset and stored in memory.

7. The method claimed in claim 1, wherein encoding includes encoding the selected quantization step sizes for the coefficient positions.

8. The method claimed in claim 1, wherein the image comprises a frame in a video.

9. The method claimed in claim 1, wherein the predetermined pixel domain distortion is a vector or matrix specifying desired pixel domain distortions for respective pixel positions in the block.

10. The method claimed in claim 9, wherein a vector of the quantization distortions for respective coefficient positions is related to the vector or matrix of desired pixel domain distortions for respective pixel positions, based upon an inverse transform matrix.

11. The method claimed in claim 1, wherein the predetermined pixel domain distortion comprises the average pixel domain distortion per block, and wherein determining the quantization distortion for each coefficient position includes solving the convex minimization problem defined as $$\min_{D_1,\ldots,D_n} \sum_i \log\frac{\sigma_i^2}{D_i} \text{ subject to } E(z_i - \hat{z}_i)^2 = D_0,$$

where $D_0$ is the predetermined average pixel domain distortion, $D_i$ is the quantization distortion of each coefficient position i, i is an index of the $1, \ldots, n$ coefficient in the set of transform domain coefficients, and $\sigma_i^2$ is the variance of the initial transform domain coefficients in the ith coefficient position.

12. An encoder for encoding an image having a plurality of blocks of pixels, the encoder comprising:
a processor;
a memory storing the blocks of pixels; and
an encoding application stored in memory and containing instructions for configuring the processor to encode the image by
processing the image using an initial quantization step size to obtain predictions and residuals for each of the blocks of pixels,
transforming the respective residuals to obtain initial transform domain coefficients for each of the blocks of pixels,
calculating a variance for each coefficient position across all initial transform domain coefficients,
determining a quantization distortion for each coefficient position in a block, based on a predetermined pixel domain distortion, by selecting the quantization distortions based on the variances for the coefficient positions, subject to linear constraints on the quantization distortions, wherein the linear constraints are based upon the predetermined pixel domain distortion;
selecting a quantization step size for each coefficient position in the block, based on the quantization distortion determined for that coefficient position,
applying the block-based transform to each of the blocks of pixels to generate a set of transform domain coefficients for each block of pixels,
for each set of transform domain coefficients, quantizing each of the transform domain coefficients using the selected quantization step size for that transform domain coefficient's coefficient position to produce a quantized coefficient, and encoding the quantized coefficients to generate a bitstream of encoded image data.

13. The encoder claimed in claim 12, wherein the predetermined pixel domain distortion comprises the average pixel domain distortion per block, and wherein the encoding application contains instructions for configuring the processor to determine the quantization distortion for each coefficient position by solving the convex minimization problem defined as $$\min_{D_1,\ldots,D_n} \sum_i \log \frac{\sigma_i^2}{D_i} \text{ subject to } (A \odot A) \cdot \begin{pmatrix} D_1 \\ \vdots \\ D_n \end{pmatrix} = \begin{pmatrix} D_0 \\ \vdots \\ D_0 \end{pmatrix}$$

and subject to $D_i < \sigma_i^2$,
where $D_0$ is the predetermined average pixel domain distortion, $D_i$ is the quantization distortion of each coefficient position i, i is an index of the $1, \ldots, n$ coefficient in the set of transform domain coefficients, $\sigma_i^2$ is the variance of the initial transform domain coefficients in the ith coefficient position, and A is a one-dimensional spectral transform matrix.

14. The encoder claimed in claim 12, wherein the encoding application contains instructions for configuring the processor to empirically search for the quantization step size using a gradient descent algorithm until the corresponding quantization distortion is realized within a threshold range.

15. The encoder claimed in claim 12, wherein the encoding application contains instructions for configuring the processor to recalculate a variance of each coefficient position, reselect quantization step sizes for each coefficient position, and re-quantize the transform domain coefficients using the reselected quantization step sizes, until a threshold value is met.

16. The encoder claimed in claim 12, wherein the encoding application contains instructions for configuring the processor to select quantization steps sizes for respective coefficient positions once for the image, and to use the selected quantization step sizes to quantize corresponding transform domain coefficients in those respective coefficient positions of each set of transform domain coefficients obtained from transforming the blocks of pixels from the image.

17. The encoder claimed in claim 12, wherein the pixel domain distortion is preset and stored in the memory.

18. The encoder claimed in claim 12, wherein the encoding application further contains instructions to configure the processor to encode the selected quantization step sizes for the coefficient positions within the bitstream.

19. The encoder claimed in claim 12, wherein the image comprises a frame in a video.

20. The encoder claimed in claim 12, wherein the predetermined pixel domain distortion is a vector or matrix specifying desired pixel domain distortions for respective pixel positions in the block.

21. The encoder claimed in claim 20, wherein a vector of the quantization distortions for respective coefficient positions is related to the vector or matrix of desired pixel domain distortions for respective pixel positions, based upon an inverse transform matrix.

22. The encoder claimed in claim 12, wherein the predetermined pixel domain distortion comprises the average pixel domain distortion per block, and wherein determining the quantization distortion for each coefficient position includes solving the convex minimization problem defined as $$\min_{D_1,\ldots,D_n} \sum_i \log \frac{\sigma_i^2}{D_i} \text{ subject to } E(z_i - \hat{z}_i)^2 = D_0,$$

where $D_0$ is the predetermined average pixel domain distortion, $D_i$ is the quantization distortion of each coefficient position i, i is an index of the $1, \ldots, n$ coefficient in the set of transform domain coefficients, and $\sigma_i^2$ is the variance of the initial transform domain coefficients in the ith coefficient position.

* * * * *